(12) United States Patent
Mandella et al.

(10) Patent No.: US 7,729,515 B2
(45) Date of Patent: *Jun. 1, 2010

(54) OPTICAL NAVIGATION APPARATUS USING FIXED BEACONS AND A CENTROID SENSING DEVICE

(75) Inventors: Michael J. Mandella, Palo Alto, CA (US); Hector H. Gonzalez-Banos, Mountain View, CA (US); Timothy J. Hawks, Menlo Park, CA (US); Marek Alboszta, San Francisco, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/591,403

(22) Filed: Oct. 31, 2006

(65) Prior Publication Data

US 2007/0211239 A1    Sep. 13, 2007

Related U.S. Application Data

(60) Provisional application No. 60/780,937, filed on Mar. 8, 2006.

(51) Int. Cl.
*G06K 9/00* (2006.01)
*G06F 3/033* (2006.01)

(52) U.S. Cl. .................. 382/106; 382/193; 345/166

(58) Field of Classification Search .................. 382/103, 382/106, 107, 108, 113, 120–123, 140, 168, 382/175–180, 181–189, 201, 232, 255, 274, 382/276, 286–298, 305, 312–321; 345/179, 345/156, 180, 179.166

See application file for complete search history.

(56) References Cited

U.S. PATENT DOCUMENTS

| | | | |
|---|---|---|---|
| 3,028,500 A | 4/1962 | Wallmark |
| 3,209,201 A | 9/1965 | Anger |
| 3,918,814 A | 11/1975 | Weiser |
| 4,749,849 A | 6/1988 | Hoeberechts et al. |
| 4,877,951 A | 10/1989 | Nuro |
| 5,005,979 A | 4/1991 | Sontag et al. |
| 5,059,789 A | 10/1991 | Salcudean |
| 5,388,059 A | 2/1995 | DeMenthon |

(Continued)

OTHER PUBLICATIONS

Goldstein et al., Classical Mechanics, 3rd Edition, Addison Wesley 2002, Ch 4.

(Continued)

*Primary Examiner*—Seyed Azarian
(74) *Attorney, Agent, or Firm*—Marek Alboszta

(57) ABSTRACT

The present invention relates to an optical navigation system for determining a pose, which includes the position and orientation of an object in an environment. The optical navigation system uses a number of beacons affixed at known locations in the environment to provide electromagnetic radiation in a sequenced pattern. An on-board optic images the radiation from the beacons onto an on-board centroid sensing device to obtain an imaged distribution of the radiation on the on-board centroid sensing device. The centroid sensing device determines the centroid of the imaged distribution and provides centroid information to a navigation unit for determining the pose of the object from the centroid. The navigation system is particularly well-suited for navigating handheld objects.

32 Claims, 13 Drawing Sheets

U.S. PATENT DOCUMENTS

| | | | |
|---|---|---|---|
| 5,812,269 | A | 9/1998 | Svetkoff et al. |
| 5,869,834 | A | 2/1999 | Wipemnyr |
| 5,945,981 | A * | 8/1999 | Paull et al. ............... 345/180 |
| 6,324,296 | B1 | 11/2001 | McSheery et al. |
| 6,577,299 | B1 * | 6/2003 | Schiller et al. ............ 345/179 |
| 6,587,809 | B2 | 7/2003 | Majoe |
| 6,724,930 | B1 | 4/2004 | Kosaka et al. |
| 6,727,885 | B1 * | 4/2004 | Ishino et al. ............... 345/156 |
| 6,781,133 | B2 | 8/2004 | Karplus et al. |
| 6,952,003 | B2 | 10/2005 | Skurnik et al. |
| 6,952,026 | B2 | 10/2005 | Lindholm |
| 6,995,445 | B2 | 2/2006 | Forrest et al. |
| 6,998,619 | B2 | 2/2006 | Karplus et al. |
| 7,022,966 | B2 | 4/2006 | Gonzo et al. |
| 7,088,440 | B2 | 8/2006 | Buermann et al. |
| 7,110,100 | B2 | 9/2006 | Buermann et al. |
| 7,268,774 | B2 * | 9/2007 | Pittel et al. ............... 345/179 |
| 7,474,809 | B2 * | 1/2009 | Carl et al. ................. 382/314 |
| 2004/0164972 | A1 | 8/2004 | Carl |
| 2005/0073508 | A1 | 4/2005 | Pittel et al. |
| 2006/0028457 | A1 | 2/2006 | Burns et al. |
| 2006/0176287 | A1 * | 8/2006 | Pittel et al. ............... 345/179 |
| 2006/0176288 | A1 * | 8/2006 | Pittel et al. ............... 345/179 |
| 2006/0267940 | A1 | 11/2006 | Groom et al. |

OTHER PUBLICATIONS

Alkeryd, Martin "Evaluation of Position Sensing Techniques for an Unmanned Aerial Vehicle", Dissertation at the Dept. of Electrical Engineering, Linkoping University 2006 Ch 4-8.

G. Gordon et al. "Silicon Optical Navigation" Agilent Technical Bulletin 2004 pp. 1-7.

"PSD Position Sensitive Detector", Selection Guide of Hamamatsu, Solid State Division, 2003.

Fish et al. "An Adaptive Center of Mass Detection System Employing A 2-D Dynamic Element Matching Algorithm for Object Tracking" (2003) IEEE pp. 778-781.

Kanatani, Kenichi "Geometric Computation for Machine Vision" (1993) Oxford Engineering Science Series 37 Ch 2-3.

* cited by examiner

OPTICAL NAVIGATION APPARATUS USING FIXED BEACONS AND A CENTROID SENSING DEVICE

RELATED APPLICATIONS

This application claims priority to U.S. Provisional Patent Application No. 60/780,937 filed on Mar. 8, 2006, which is incorporated herein in its entirety. This application is related to U.S. Pat. No. 7,474,809 filed on Mar. 26, 2007, which is a continuation-in-part of U.S. Pat. No. 7,203,384 filed on Aug. 13, 2003, which claims priority from U.S. Provisional Application No. 60/450,244 filed on Feb. 24, 2003.

FIELD OF THE INVENTION

The present invention relates generally to optical navigation of objects with the aid of fixed beacons for emitting electromagnetic radiation in a sequenced pattern and an onboard centroid sensing device.

BACKGROUND OF THE INVENTION

Optical navigation is an intuitive and precise way to track moving objects. The approach is intuitive because our own human stereo vision system calculates object locations and trajectories by optical triangulation. The precision of optical navigation is due to the very short wavelength of electromagnetic radiation in comparison with typical object dimensions, negligible latency in short distance measurements due to the extremely large speed of light and relative immunity to interference.

Optical navigation typically employs several cameras to determine the position or trajectory of an object in an environment by studying images of the object in the environment. Such optical capturing or tracking systems are commonly referred to as optical motion capture (MC) systems. In general, motion capture tends to be computationally expensive because of significant image pre-and post-processing requirements, as well as additional computation associated with segmentation and implementation of algorithms. One particular system taught by McSheery et al. in U.S. Pat. No. 6,324,296 discloses a distributed-processing motion capture system that employs a number of light point devices as markers, e.g., infrared LEDs, attached to the object whose motion is to be determined. The markers use unique sequences of light pulses to represent their unique identities and thus enable filtering out of information not belonging to the markers (i.e., background noise) by the imaging cameras located in the environment. Since McSheery's system permits a great deal of irrelevant information from the imaging sensors (e.g., CCDs) to be discarded before image processing, the system is less computationally expensive than more traditional motion capture systems.

Another three-dimensional position and orientation sensing system that employs markers on the object is taught by Kosaka et al. in U.S. Pat. No. 6,724,930. In this case the markers are uniquely identified based on color or a geometric characteristic of the markers in the extracted regions. The system uses an image acquisition unit or camera positioned in the environment and relies on image processing functions to remove texture and noise. Segmentation algorithms are used to extract markers from images and to determine the three-dimensional position and orientation of the object with respect to the image acquisition apparatus.

Still another way of employing markers in position and orientation detection is taught in U.S. Pat. No. 6,587,809 by Majoe. The object is tracked by providing it with markers that are activated one at a time and sensed by a number of individual sensors positioned in the environment. The position of the energized or active marker is determined by a control unit based on energy levels received by the individual sensors from that marker.

The above approaches using markers on objects and cameras in the environment to recover object position, orientation or trajectory are still too resource-intensive for low-cost and low-bandwidth applications. This is due to the large bandwidth needed to transmit image data captured by cameras, the computational cost to the host computer associated with processing image data, and the data network complexity due to the spatially complicated distribution of equipment (i.e., placement and coordination of several cameras in the environment with the central processing unit and overall system synchronization).

Under certain conditions, the large computational burden of image processing can be circumvented. Prior art teaches apparatus and methods that identify and track only a few illuminated points or markers associated with the object. Such apparatus typically employ a position sensing means such as a position sensitive detector (PSD) originally described by J. T. Wallmark, "A new semiconductor photocell using lateral photoeffect", Proc. IRE, vol. 45, no. 4, pp. 474-483, April 1957 (see also U.S. Pat. No. 3,028,050 to J. T. Wallmark) or analogous device for sensing a position at which electromagnetic radiation associated with the object or the environment is incident on the sensor. General information about a beam position identification apparatus is contained in U.S. Pat. No. 3,209,201 to Anger. More specific teachings about an optical position sensor with a four quadrant photo-sensitive detector for measuring the X-Y position of an object based on light energy emitted from the object are found in U.S. Pat. No. 3,918,814 to Weiser.

The most successful type of position sensitive detectors (PSDs) thus far is based on a photosensitive, reverse biased p-n semiconductor junction. Salient aspects of such p-n semiconductor junction PSDs are described in U.S. Pat. No. 4,749,849 to Hoeberechts et al. and in U.S. Pat. No. 4,877,951 to Muro. Further improvements to PSD designs have been made to reduce noise, increase sensitivity and obtain a well-behaved response. Specific teachings on how to eliminate stray light is found in U.S. Pat. No. 5,869,834 to Wipenmyr, and an enhanced sensitivity PSD is discussed in U.S. Pat. No. 6,952,026 to Lindholm. The reader will find information about improved tetra-lateral PSDs in JP Pat. No. S61-108930 and an alternative circular structure PSD in JP Pat. No. H6-204555.

Several recent PSD implementations use a silicon avalanche photodiode with internal gain as described, for example, by Karplus et al. in U.S. Pat. Nos. 6,781,133 and 6,998,619. Further, U.S. Pat. No. 6,952,003 to Skurnik et al. teaches the use of a very high-speed photodetector system capable of position sensing by using a PIN photodiode array. More recently still, Gonzo et al. teach systems and methods for light spot position and color detection using discrete response position sensitive detectors (DRPSDs) in U.S. Pat. No. 7,022,966. Some devices aimed at higher resolution and less constrained PSD geometry use thin organic films to produce organic position sensitive detectors (OPSDs) as described in U.S. Pat. No. 6,995,445 to Forrest et al.

Inspired by PSD technology, U.S. Pat. No. 5,005,979 to Sontag et al. teaches how to optically determine the position of an object by providing at least one collimated beam that is issued from a particular position on the object and bearing a fixed and definite geometric relationship to the sought position. The one or more collimated beams impinge on a fluorescent foil or plate to stimulate emission, which is captured by fibers around the edge of the foil or plate and delivered to a PSD. The PSD then delivers an output signal that is proportional to the location of the "center of gravity" or centroid of the illumination. Another related PSD inspired position and orientation sensing solution using a two-dimensional approach is taught by Salcudean in U.S. Pat. No. 5,059,789.

Still another approach to three-dimensional position triangulation employing PSDs is taught by Svetkoff et al. in U.S. Pat. No. 5,812,269. Here, the PSD is employed in association with a modulated laser beam that is scanned across the object. Knowledge of object structure and its reflectance characteristics allow one to collect the reflected radiation with the aid of a PSD and extract information such as height, intensity and other data by triangulation.

A more recent use of PSD technology for object navigation is discussed by Martin Alkeryd, "Evaluation of Position Sensing Techniques for an Unmanned Aerial Vehicle", Dissertation at the Department of Electrical Engineering, Linkoping University, 2006, chapters 4 and 8. The system studied by Alkeryd employs infrared LED markers that are attached on the object and turned on one at a time. A PSD sensor with appropriate optics is positioned on the ground in the environment to collect the light emitted from the LEDs. Since the LEDs operate in the infrared range a filter removes all light at wavelengths below 750 nm to reduce background noise caused by visible light. The teaching further suggests modulation of LED emission, including ON-OFF keying to improve signal to noise (SNR) performance of the navigation system.

The use of PSDs in optical motion capture and navigation systems brings many advantages, but is not sufficiently agile for applications involving high-precision, low-bandwidth and high capture rate navigation of small objects. In addition, the systems are ill-suited in situations where the objects are hand-held because the requirement for positioning cameras in the user's environment (e.g., working area) is constraining. For example, when navigating a hand-held object such as a mouse or a jotting implement, e.g., as described in U.S. Pat. No. 7,203,384 to Carl, the distributed nature of a motion capture system in a jotting environment even if employing PSD sensors is cumbersome.

What is needed is a high-precision, low-bandwidth and high capture rate optical navigation system for tracking objects in close-range environments. More precisely, what is required is a navigation system that is sufficiently robust to navigate even rapidly moving hand-held objects, including pointers, controllers, mice, jotting implements and other small objects in constrained environments or work-spaces.

SUMMARY OF THE INVENTION

The present invention provides an optical navigation system for determining a pose, which includes the position and orientation of an object in an environment. The optical navigation system uses a number of beacons that are affixed at known locations in the environment to provide electromagnetic radiation in a sequenced pattern. An on-board optic, i.e., an optic mounted on-board the object, images the electromagnetic radiation from the beacons onto an on-board centroid sensing device. Thus, the on-board optic produces an imaged distribution of the electromagnetic radiation on the on-board centroid sensing device and the centroid sensing device determines the centroid of the imaged distribution. The optical navigation system also has a navigation unit for determining the pose of the object from the centroid.

The beacons are preferably one-dimensional or point-like and implemented by light emitting diodes (LEDs), laser diodes and the like. The beacons can also be extended sources such as lamps, screens, displays and other light sources as well as any objects providing sufficiently highly levels of electromagnetic radiation that can be controlled. These include projected points and objects, as well as points and object concentrating and reflecting radiation originating in the environment or from on-board object. The emission pattern of the beacons is dictated by the locations at which they are affixed in the environment and their on/off timing. In other words, the emission pattern is spatially set by placing the beacons in certain locations and it is temporally varied by turning the beacons on and off at certain times.

In many embodiments, the sequenced pattern in which the beacons emit is modulated, meaning that the locations of the beacons do not change but their intensity and on/off timing is adjusted. This can be performed by a mechanism belonging to the navigation unit and may involve any generally well-accepted amplitude and frequency modulation techniques. Preferably, a feedback is established such that the mechanism adjusts the sequenced pattern and more precisely the modulation based on one or more parameters of the pose (or even the full pose) of the object determined by the navigation unit.

In some embodiments it is advantageous to amplitude modulate the beacons at predetermined frequencies. This may be done for improving filtering and signal detection in an otherwise optically noisy environment, e.g., outdoors. The on/off timing of the sequenced pattern can include one or more beacons lighting up or emitting at one time.

In other embodiments the locations where the beacons are affixed are changed by a mechanism based on one or more parameters of the object's pose. For example, some of the beacons can be moved by the mechanism or even permanently removed, while others may be added at new locations depending on the object's pose or at least one parameter of the pose. The locations of the beacons and the sequenced pattern can be selected such that only one beacon is turned on or emits at one time. Alternatively, more than one beacon of the spatial arrangement can emit at one time.

The on-board centroid sensing device can be selected from a large group of candidates including, for example, devices such as semiconductor-type position sensitive detectors (PSDs), optical waveguide-based position sensitive detectors and organic material position sensitive detectors. When choosing any of the above, but especially in the case of a semiconductor-type PSD the detector can be segmented such that different segments thereof are sensitive to radiation arriving from different portions of the optic's field of view. It is also advantageous to use a PSD that conforms to the field of view of the optic, which in many cases is round or rotationally symmetric. In some specific embodiments it may also be advantageous to employ a non-planar PSD, e.g., to permit the use of a simpler or higher-performance optic.

Depending on the application of the optical navigation system and the environment, the one or more beacons can be affixed at certain locations on a host structure residing in the environment. Although the host structure may, in general, be any solid object it is frequently advantageous to affix one or more of the beacons to a computing device, a communication device or any other user device that can aid in determining a set of coordinates for navigating the object. Indeed, the computing or communication device may even cooperate with or form a part of the optical navigation system, e.g., by hosting the navigation unit or mechanism(s) for adjusting the sequenced pattern of the beacons. In one specific embodiment of the invention, the computing device may be a personal computer with a jotting surface. The jotting surface may be integrated with a screen, e.g., as in tablet PCs, ultra-mobile computers or PDAs. Of course, the same can be done in the case of cellular telephones or other communication devices. In order to be invisible to a human user and use a portion of the spectrum at which ambient radiation is lower, the beacons may emit electromagnetic radiation at an infrared wavelength rather than a visible wavelength.

The object being navigated can be any device that requires precision navigation, and in particular a hand-held device. Some exemplary devices include mice, remote controllers and joysticks. In a preferred embodiment, the hand-held device is a jotting implement for cooperating with a jotting surface in the environment. In this embodiment one or more of the beacons may be affixed such that they are indexed to the jotting surface; i.e., they remain in a known relationship to the jotting surface and may even be affixed directly to the jotting surface.

In still another embodiment the hand-held device is a hand-held implement for cooperating with a display in the environment; e.g., the hand-held implement is a remote pointer. Once again, one or more of the beacons can be indexed to the display in this embodiment.

In accordance with a method of the invention optical determination of the pose of the object in the environment is undertaken in several steps. In one step a number of beacons is affixed at certain locations in the environment so that they emit electromagnetic radiation in a pattern. The object whose one or more pose parameters are to be determined is provided with an on-board optic for imaging the electromagnetic radiation onto an on-board centroid sensing device. The centroid sensing device determines a centroid of the imaged distribution of the electromagnetic radiation and the the pose of the object is determined from the centroid.

In a preferred embodiment of the method, the pattern of emission of the electromagnetic radiation by the beacons is controlled based on one or more pose parameters that are determined. The control can be a temporal control of when the beacons are on, or spatial control of which beacons should be used and/or which beacons should be relocated and affixed at new locations in the environment.

Depending on the application of the method and navigation requirements, the pose includes one or more absolute pose parameter(s). The absolute pose parameters are defined with respect to the environment or in a global coordinate system rather than in the object's coordinate system. Thus, the method can yield the absolute position of any select point on said object in the environment's global coordinates.

In certain applications, such as when the object is being moved by a user, it is advantageous to provide the user with a feedback of the absolute value of one or more pose parameters determined from the centroid. In a specific embodiment where the object is a jotting implement, it is advantageous that the feedback be a trace of the nib's motion in 3-D space or the motion of the nib as confined by a surface constraint imposed by a jotting surface. The latter trace is conveniently called a digital ink trace.

Alternatively, the method of invention can also be employed to determine a relative motion of the object from at least one parameter of the object's pose. For example, rather than determining the absolute value of any specific parameter from a rigorous 3-D navigation algorithm, an optical flow computation is applied to determine changes in one or more parameters. Such application may be useful when the object is a hand-held device such as a mouse, a pointer, a joystick a remote control or other device that operates in a relative mode, e.g., a scroll mode. In these applications a user feedback of the relative motion is provided, preferably in the form of a visual indicator such as a cursor on a screen or on a display.

The details of the invention will now be explained in the attached detailed description with reference to the attached drawing figures.

BRIEF DESCRIPTION OF THE DRAWINGS

FIG. 7A is an isometric view of a PSD for optical navigation in accordance with the invention.

FIG. 7B is a cross-sectional side view of another centroid sensing device for optical navigation in accordance with the invention.

DETAILED DESCRIPTION

Figure 1:
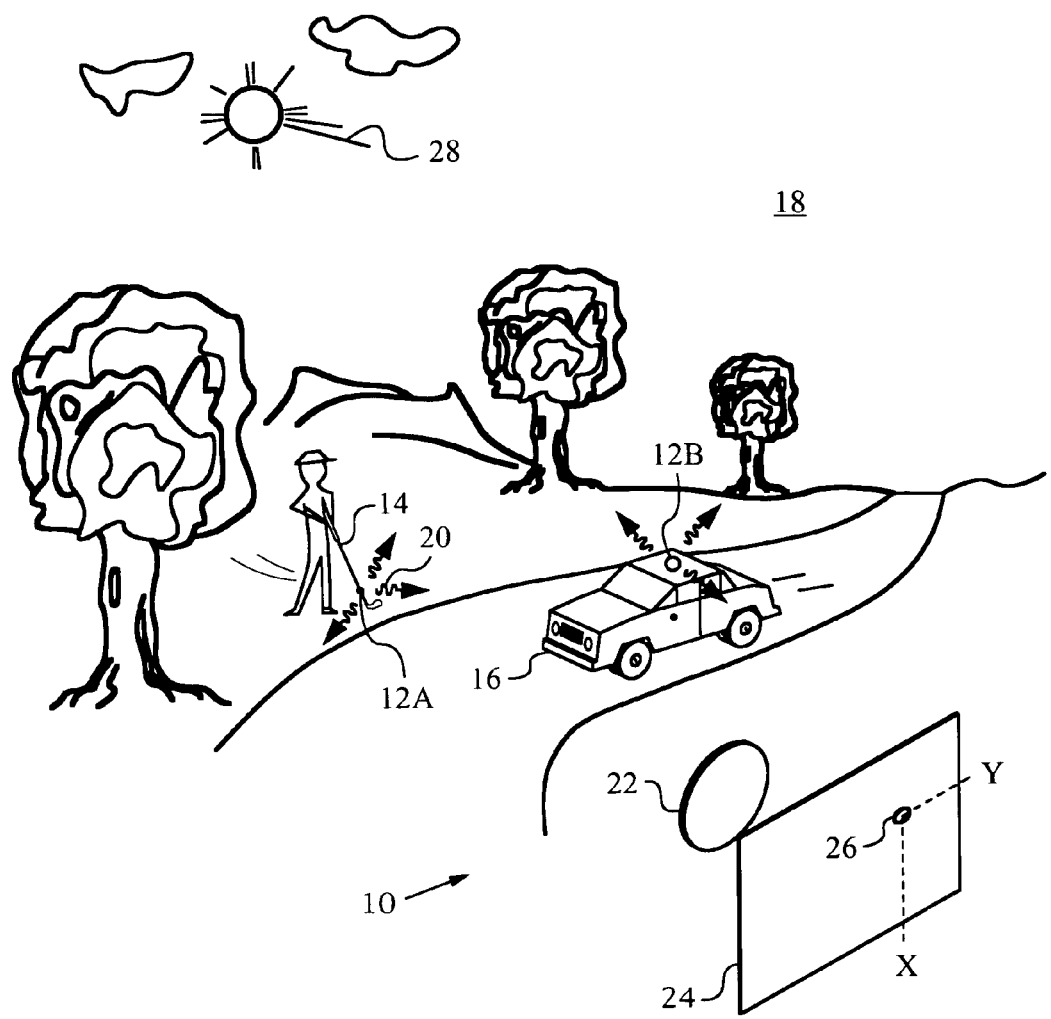
FIG. 1 (Prior Art) is a three-dimensional diagram illustrating a prior art method of using position sensitive devices to track moving objects.

The many novel and unobvious aspects of the present invention will be best understood by initially referring to a prior art system 10 as shown in FIG. 1. System 10 is a distributed motion capture system employing illuminated markers 12A, 12B attached to objects 14, 16 that are tracked in an environment 18. Markers 12A, 12B emit electromagnetic radiation 20 of a certain wavelength at known times. An optic 22 images radiation 20 on a position sensitive detector (PSD) 24 placed at a known location in environment 18. Note that most prior art motion capture systems use several detector modules to achieve a large field of view and higher measurement accuracy.

PSD 24 measures the center-of-mass or centroid 26 of the imaged radiation 20, which is typically the center of a spot corresponding to the marker that is active at the time of measurement. In other words, PSD 24 provides an x and a y position in its sensor plane corresponding to the centroid of the intensity distribution corresponding to imaged radiation 20. It should be noted that ambient illumination 28 is also imaged and produces background noise that affects the position of centroid 26. Filtering techniques and appropriate choice of wavelength 20 are used to reduce the effects of background noise.

In precision navigation of a small object moving rapidly in a close-range environment the field of view of the system must be large, the capture rate has to be high and the system has to tolerate frequent occlusions. This is especially true of hand-held objects manipulated by a human user in a home or work environment. Clearly, the prior art motion capture system is not a good candidate for such tasks.

Figure 2:
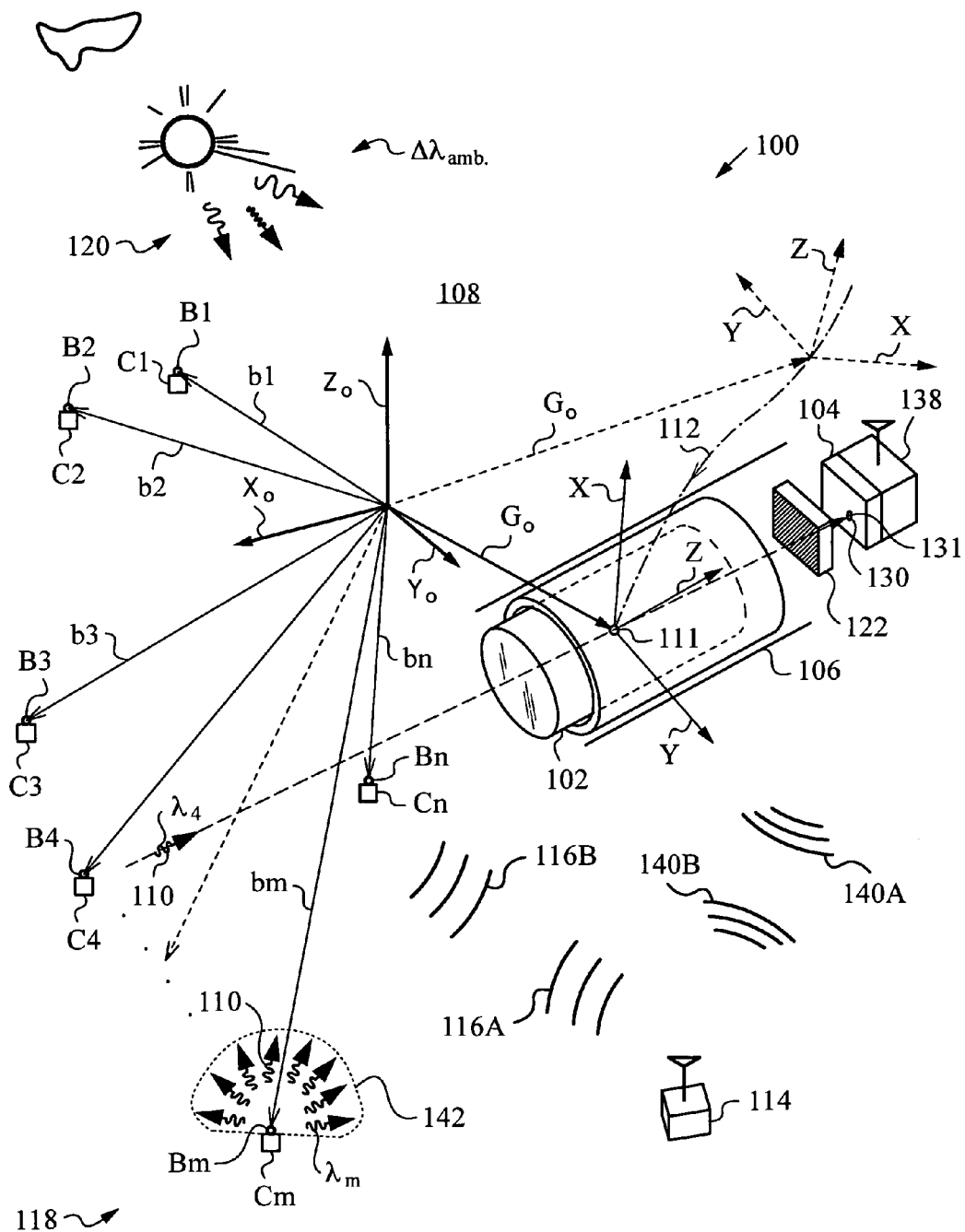
FIG. 2 is a three-dimensional diagram illustrating an optical navigation system according to the invention.

In contrast to previous distributed motion capture systems, an optical navigation system 100 according to the invention employs an on-board optic 102 for imaging electromagnetic radiation onto an on-board centroid sensing device 104, as shown in FIG. 2. In other words, optic 102 and centroid sensing device 104 are both mounted on-board an object 106 (only partially shown) being navigated, rather than being placed at a known location in an environment 108. Furthermore, system 100 employs a number of beacons B1, B2, ..., Bn affixed at known locations described by vectors b1, b2, ..., bn in environment 108 for emitting electromagnetic radiation 110 in a pattern.

Conveniently, environment 108 is parameterized by global coordinates $(X_o, Y_o, Z_o)$ in which vectors b1, b2, ..., bn describe the locations of corresponding beacons B1, B2, ..., Bn. For navigation purposes, object 106 is described in its own object coordinates (X,Y,Z). The position and orientation of object 106 in global coordinates, referred to as pose herein, are defined by an origin displacement vector $G_o$ and an angular orientation of object coordinates relative to global coordinates. Although there are many conventions for describing orientation, we will use the Euler angle based passive rotation convention in which object coordinates are attached to object 106 while object 106 is rotated from its initial position.

Figure 3:
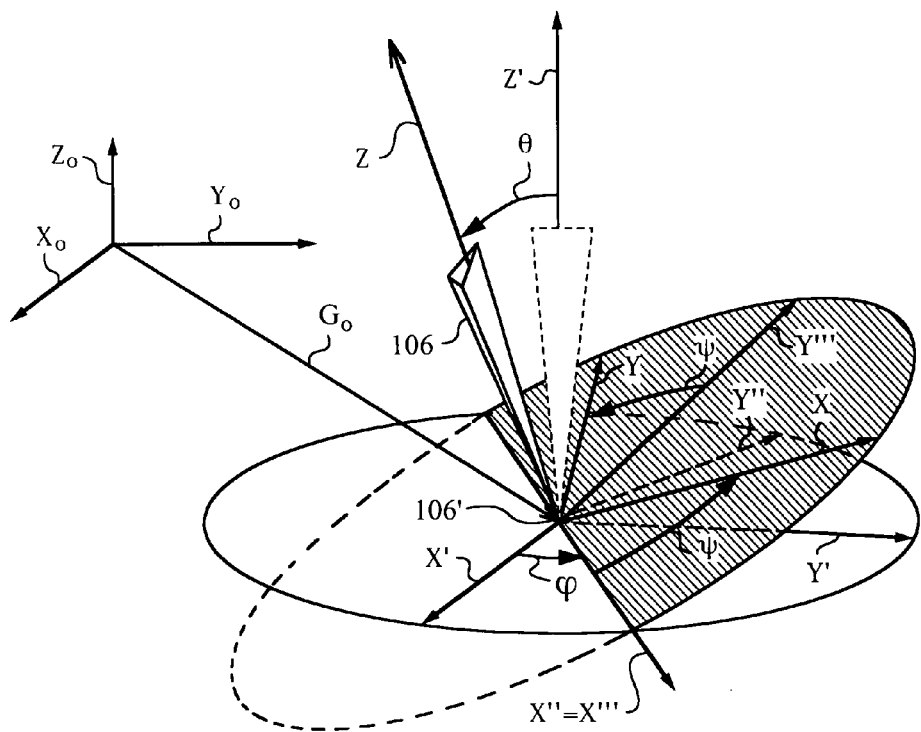
FIG. 3 is a diagram illustrating the Euler rotation convention employed in the navigation system of the invention.

FIG. 3 illustrates the rotation convention in terms of Euler angles $(\phi, \theta, \psi)$ applied to object 106 about an origin conveniently selected to coincide with a tip 106' of object 106. First, we perform a counterclockwise rotation of object 106 by first Euler angle $\phi$ of primed object coordinates (X',Y',Z') about the Z' axis. This rotation of the object coordinates does not affect the Z' axis so once rotated Z" axis is collinear with non-rotated Z' axis (Z"=Z'). On the other hand, axes X' and Y' are rotated by first Euler angle $\phi$ to yield once rotated axes X" and Y".

Second counterclockwise rotation by second Euler angle $\theta$ is applied to once rotated object coordinates (X",Y",Z") about the once rotated X" axis and thus it does not affect the X" axis (X'''=X"). On the other hand, axes Y" and Z" are rotated by second Euler angle $\theta$ to yield twice rotated axes Y''' and Z'''.

A third counterclockwise rotation by third Euler angle $\psi$ is applied to twice rotated object coordinates (X''',Y''',Z''') about twice rotated axis Z''' already collinear with object axis Z rotated by all three Euler angles. Meanwhile, twice rotated axes X''',Y''' are rotated by $\psi$ to yield object axes X,Y rotated by all three Euler angles. Object axes X,Y,Z rotated by all three Euler angles $\phi$, $\theta$ and $\psi$ define Euler rotated object coordinates (X,Y,Z) as shown in FIG. 2. For more background on rigid body motion and other rotation conventions the reader is referred to textbooks on classical mechanics such as Goldstein et al., Classical Mechanics, 3$^{rd}$ Edition, Addison Wesley 2002, chapter 4.

Returning now to FIG. 2, we note that the origin of object coordinates (X,Y,Z) is a point of view 111 of optic 102 rather than tip 106' or other reference point on the body of object 106 (object 106 is shown in its Euler rotated state). This choice of origin is convenient for navigation and does not limit the choice of object coordinates, as will be appreciated by those skilled in the art. The pose of object 106 is completely described by six parameters, namely the three components (x,y,z) of displacement vector $G_o$ from the origin of global coordinates $(X_o, Y_o, Z_o)$ to the origin or reference point, in this case point of view 111, on object 106 and the three Euler angles $(\phi, \theta, \psi)$. A trajectory 112 of object 106 is fully described by these six parameters and time, i.e., $(x,y,z,\phi,\theta,\psi,t)$.

In the embodiment shown in FIG. 2, beacons B1, B2, ..., Bn are point sources such as LEDs or laser diodes. However, any point-like source or extended source of electromagnetic radiation can function as a beacon. In fact, any object providing sufficiently high levels of electromagnetic radiation that can be controlled qualifies as a beacon in the sense of the invention. Such objects include, without limitation, lamps, screens, displays, fiber tips, projected points, as well as points and objects concentrating and reflecting radiation originating in environment 108 or projected into environment 108 from on-board object 106. For example, retro-reflectors can be used as beacons to provide back-reflected electromagnetic radiation from an on-board source (e.g., a laser beam scanned into the environment from on-board object 106) to centroid sensing device 104.

In the present embodiment, LEDs B1, B2, ..., Bn are the only beacons and they are controlled by corresponding controls C1, C2, ..., Cn and a central unit 114 that communicates with the controls. The communications between unit 114 and controls C1, C2, ..., Cn are carried by wireless up-link and down-link signals 116A, 116B. Of course, any method of communication, including wired or optical, can be implemented between central unit 114 and controls C1, C2, ..., Cn. Different communication equipment will typically require different supporting circuitry, as will be appreciated by those skilled in the art. Taken together, controls C1, C2, ..., Cn and unit 114 form an adjustment mechanism 118 for setting or adjusting a sequenced pattern of LEDs B1, B2, ..., Bn.

On-board optic 102 has a field of view sufficiently large to capture electromagnetic radiation 110 provided by most or all beacons B1, B2, ..., Bn and image it onto on-board centroid sensing device 104. Mathematically, it is known that to recover the absolute values of all parameters of the pose of object 106 in environment 108 at least four from among beacons B1, B2, ..., Bn need to be in the field of view of optic 102. To ensure this condition, it is advantageous to employ a wide field of view lens as optic 102.

Figure 4A:
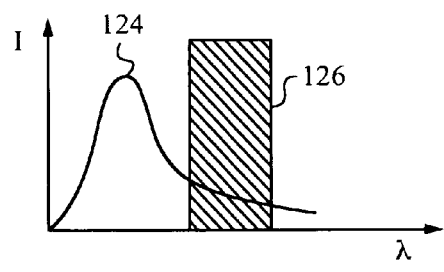
FIG. 4A is a graph illustrating the intensity of a typical ambient emission spectrum.

System 100 has a filter 122 before centroid sensing device 104 to reduce the level of ambient radiation 120 impinging on centroid sensing device 104. Concurrently, the wavelengths of electromagnetic radiation 110 provided by LEDs B1, B2, ..., Bn are selected such that they are passed by filter 122. In the present case, ambient radiation 120 is produced by the sun and spans an emission spectrum $\Delta\lambda_{amb.}$, whose intensity (I) peaks in the visible range and drops off in the infrared range as generally shown by graph 124 in FIG. 4A. Consequently, it is advantageous to select the wavelengths $\lambda_1, \lambda_2, \ldots, \lambda_n$ of electromagnetic radiation emitted by LEDs B1, B2, ..., Bn to reside in an infrared range 126.

Figure 4B:
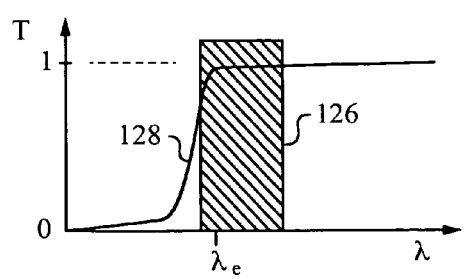
FIG. 4B is a graph illustrating a transmittance of an infrared filter employed in the embodiment of FIG. 2.

It is optional whether all wavelengths $\lambda_1, \lambda_2, \ldots, \lambda_n$ are different or equal. In some embodiments, different wavelengths can be used to differentiate between LEDs B1, B2, ..., Bn. In the present embodiment, however, all LEDs B1, B2, ..., Bn are infrared LEDs emitting at the same wavelength $\lambda_e$ equal to 950 nm. A transmittance (T) of filter 122 is selected as shown by graph 128 in FIG. 4B, so that all wavelengths in infrared range 126, including $\lambda_e$ in particular pass through. Wavelengths in the far infrared range upwards of 1,000 nm where ambient radiation 120 is even weaker can also be used if a higher signal to background ratio is desired.

Returning again to FIG. 2, we see how electromagnetic radiation 110 at the wavelength of 950 nm emitted by beacon B4 passes filter 122 and is imaged onto centroid sensing device 104. Device 104 can be selected from a large group of candidates including, for example, devices such as semiconductor-type position sensitive detectors (PSDs), optical waveguide-based position sensitive detectors and organic material position sensitive detectors. In the present embodiment, device 104 is a semiconductor-type position sensitive detector (PSD) employing a reverse biased p-n junction.

Optic 102 produces an imaged distribution 130 of electromagnetic radiation 110 on PSD 104. PSD 104, in turn, generates electrical signals that represent the x-y position of a center-of-mass or centroid 131 of imaged distribution 130 in x-y plane of PSD 104. In the present case, LED B4 is a point-like source of electromagnetic radiation 110 and therefore optic 102 images it to a spot-type distribution 130. In general, it is desirable to keep spot 130 relatively small by appropriate design of optic 102, which is preferably a lens with good imaging properties including low aberration, single viewpoint imaging and high-performance modulation transfer function (MTF). In general, however, optic 102 can be refractive, reflective or catadioptric.

Figure 5:
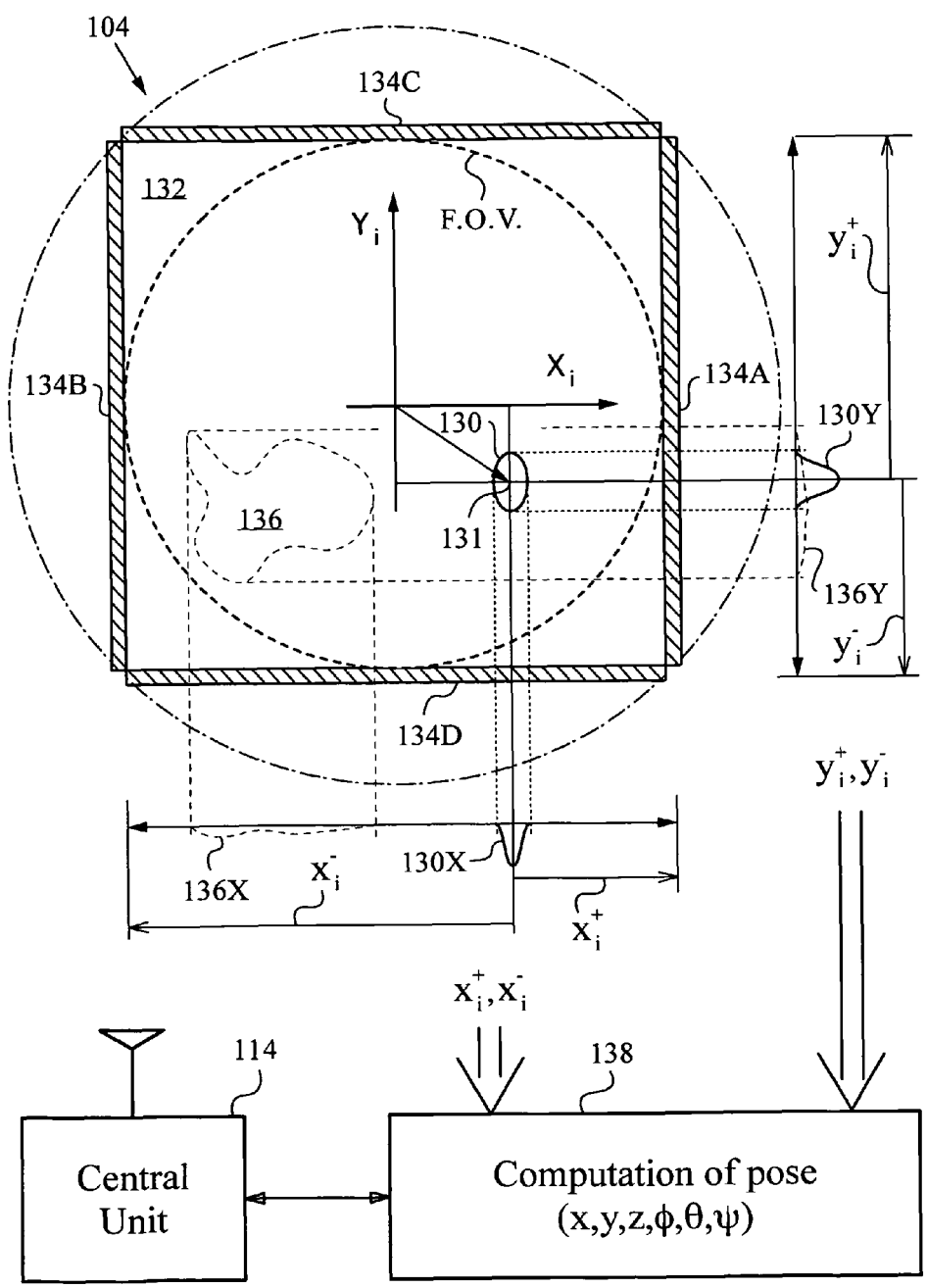
FIG. 5 is a diagram with a top plan view of the surface of a centroid sensing device in the form of a position sensitive detector (PSD).

For a better understanding of PSD 104 we turn to the diagram with a plan view of its top surface 132 shown in FIG. 5. To distinguish coordinates in the image plane that is coplanar with top surface 132 of PSD 104, the image coordinates are designated $(X_i, Y_i)$. Note that the field of view (F.O.V.) of lens 102 is designated in a dashed line and is inscribed within the rectangular surface 132 of PSD 104. This means that the entire F.O.V. of lens 102 is imaged onto PSD 104. In an alternative embodiment, the F.O.V. may circumscribe surface 132, as indicated in the dashed and dotted line.

PSD 104 has two electrodes 134A, 134B for deriving signals corresponding to the x-position, namely $x_i^+$ and $x_i^-$, and two electrodes 134C, 134D for obtaining $y_i^+$ and $y_i^-$ signals. The manner in which these signals are generated and processed to obtain the location $(x_i, y_i)$ of centroid 131 is well-known to those skilled in the art and will not be discussed herein. For more information on the subject the reader is referred to manufacturer-specific PSD literature, such as, e.g., "PSD (Position Sensitive Detector)" Selection Guide of Hamamatsu, Solid State Division, July 2003.

The intensities 130X, 130Y of imaged distribution 130, i.e., spot 130, along the $X_i$ and $Y_i$ axes are visualized along the sides. Another imaged distribution 136 due to ambient radiation 120 is also indicated with a dashed line. Corresponding intensities 136X, 136Y along the $X_i$ and $Y_i$ axes are also visualized along the sides. Because of the action of filter 122, intensities 136X, 136Y are low in comparison to 130X, 130Y and the corresponding centroid position thus includes a negligibly small shift error due to the background noise on the desired signal. Such background can be removed with any well-known electronic filtering technique, e.g., standard background subtraction. Corresponding electronics are known and will not be discussed herein.

PSD 104 is connected to a navigation unit 138 and delivers signals $x_i^+, x_i^-$, and $y_i^+, y_i^-$ to it. Navigation unit 138 is also in communication with central unit 114 by any suitable link so that it knows which beacon is active (here beacon B4) and thus responsible for centroid 131 at any given time.

It is convenient to establish the link wirelessly with up-link and down-link signals 140A, 140B, as shown in FIG. 2.

During operation, optical navigation system 100 uses the knowledge of which beacon produces centroid 131 described by image coordinates $(x_i, y_i)$ and the beacon's location in environment 108 or global coordinates $(X_o, Y_o, Z_o)$ to determine pose parameters $(x, y, z, \phi, \theta, \psi)$ of object 106. Note that beacons B1, B2, ..., Bn need not be attached or affixed at any permanent location in environment 108, as long as their location at the time of emission of radiation 110 is known to system 100. Moreover, any sequenced pattern of beacons B1, B2, ..., Bn can be used, even a pattern calling for all beacons B1, B2, ..., Bn to be on simultaneously. In the latter case, a constellation of n spots is imaged on PSD 104 and centroid 131 is the center of mass (C.O.M.) of the entire constellation of n spots 130, i.e., it is not associated with a single spot.

For better clarity of explanation, we first consider a sequenced pattern with only one beacon on at a time. Following such pattern, beacon B4 is turned off and beacon Bn is turned on to emit radiation 110. Note that an intensity distribution 142 of radiation 110 has a wide cone angle such that optic 102 can image radiation 110 even at steep angles of incidence. Alternatively, given knowledge of all possible relative positions between object 106 and beacon Bn, a mechanism can be provided to optimize angular distribution 142 for capture by optic 102.

To commence motion capture, controls C1, C2, ..., Cn and unit 114, i.e., adjustment mechanism 118 implements an initial sequenced pattern of LEDs B1, B2, ..., Bn. The initial pattern can be provided by navigation unit 138 to unit 114 of adjustment mechanism 118 via up-link signals 140A. The initial pattern can be based on any parameter of the last known pose or any other navigation information. Alternatively, initial sequenced pattern is standard.

Figure 6:
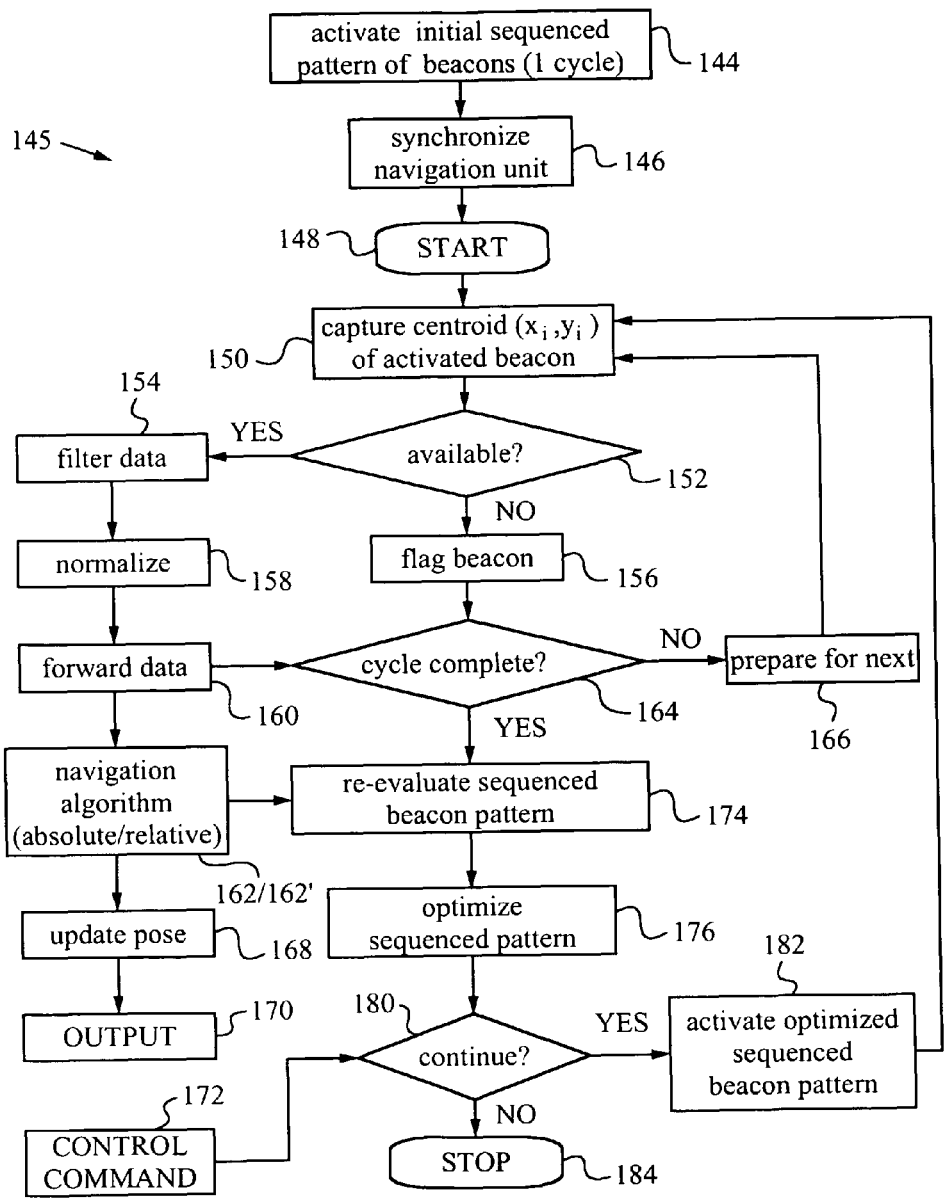
FIG. 6 is a diagram of an exemplary motion capture program employing absolute and relative navigation algorithms.

A flow diagram in FIG. 6 illustrates the steps of an exemplary motion capture program 145 implemented by navigation unit 138 and mechanism 118. Algorithm 145 commences with activation of initial sequenced pattern 144 for one cycle and synchronization of navigation unit 138 with mechanism 118 in step 146. This is done by matching signals $x_i^+, x_i^-$, and $y_i^+, y_i^-$ delivered by PSD 104 to navigation unit 138 with each active beacon as individual beacons B1, B2, ..., Bn are turned on and off by controls C1, C2, ..., Cn in accordance with initial sequenced pattern. Drop out of any one beacon is tolerated, as long as synchronization with at least four beacons is confirmed for absolute navigation or fewer than four but at least one for relative navigation.

Motion capture starts in step 148. In step 150 signals $x_i^+, x_i^-$, and $y_i^+, y_i^-$ encoding centroid 131 are sent from PSD 104 to navigation unit 138 for processing. In step 152 signals are tested for presence (sufficient power level for further processing) and are then filtered in step 154 to obtain filtered data corresponding to centroid 131. Filtering includes background subtraction, signal gain control including lock-in amplification and/or other typical signal processing functions. Absence of signals $x_i^+, x_i^-$, and $y_i^+, y_i^-$ is used to flag the corresponding beacon in step 156.

After filtering, the data is normalized in step 158. This step involves time-stamping, removing effects of known optical aberrations due to optic 102 and preparing the data for processing by either absolute or relative navigation algorithms. Normalization also formats data points from each cycle and may include buffering the data, if necessary, while centroid 131 from the next beacon in the pattern is queued up or buffering until a sufficient number of centroids 131 have been captured to perform reliable normalization. In a preferred embodiment, beacons B1, B2, ..., Bn are amplitude modulated with a series of pulses. In this embodiment, normalization further includes selection of the pulse with most suitable amplitude characteristics (e.g., full dynamic range but no saturation) and discarding signals from other pulses.

In step 160 normalized data of centroid 131 is sent to a navigation algorithm 162. Contemporaneously, or earlier depending on timing and buffering requirements, motion capture program 145 submits a query 164 whether the first cycle of initial sequenced pattern in complete. The answer is used by navigation algorithm 162 in determining the parameters of the pose of object 106 and to prepare for capturing the next centroid in step 166.

Navigation algorithm 162 preferably determines all pose parameters $(x,y,z,\phi,\theta,\psi)$ at initialization time $t_{init.}$ in global coordinates $(X_o,Y_o,Z_o)$ based on known locations of beacons B1, B2, ..., Bn, i.e., known vectors b1, b2, ..., bn.

Only centroids 131 that are available (i.e., no drop out of corresponding beacon or other failure) and yield reliable centroid data are used. At least four centroids 131 need to be captured from the initial sequenced pattern to reconstruct pose parameters $(x,y,z,\phi,\theta,\psi)$ in global coordinates $(X_o,Y_o,Z_o)$. The pose is called absolute when all pose parameters are known in global coordinates $(X_o,Y_o,Z_o)$ at a given time, e.g., at $t_{init.}$. Navigation using absolute pose or at least one parameter of absolute pose is referred to as absolute navigation.

In one embodiment beacons B1, B2, ..., Bn are positioned on a plane in a rectangular grid pattern and the pose parameters are determined based on projective, i.e., perspective geometry. In this approach the rules of perspective geometry using the concept of vanishing points lying on a horizon line are applied to determine the location of point of view 111. Specifically, given the locations of at least four coplanar beacons lying on at least three straight intersecting lines framing a rectangular grid in the field of view F.O.V. of optic 102, absolute navigation algorithm 162 defines a horizon and finds conjugate vanishing points from which point of view 111 is determined. Once point of view 111 is known, pose parameters $(x,y,z,\phi,\theta,\psi)$ of object 106 are determined. Initially, point of view 111 is the origin or reference point at $(x,y,z)$. As mentioned above, any other point on object 106 can be used based on a coordinate transformation. The perspective geometry and vector algebra necessary to perform absolute navigation are known to skilled artisans of optical image processing and will not be discussed herein. For more details, the reader is referred to K. Kanatani, "Geometric Computation for Machine Vision", Oxford Science Publications; Clarendon Press, Oxford; 1993, Chapters 2-3 and to U.S. Pat. No. 7,203,384 to Carl.

In embodiments where a large number of beacons are used and are available (low drop out), the rules of perspective geometry can be employed to filter beacons that are not-conformant therewith. In other words, the perspective geometry constraint can be used as an additional filter for high-precision absolute navigation.

Absolute pose $(x,y,z,\phi,\theta,\psi)$ determined by navigation unit 138 at initial time $t_{init.}$ in step 162 is used to update trajectory 112 during pose update step 168. Depending on the motion of object 106 and required resolution or accuracy for trajectory 112, the centroid capture rate and time between determinations of absolute pose should be adjusted. At high-speed capture rates absolute navigation algorithm 162 can keep updating pose $(x,y,z,\phi,\theta,\psi)$ in a continuous fashion based on at least four most recently captured centroids or even as each successive centroid. This can be accomplished by substituting the most recently captured centroid for the oldest centroid. Computed trajectory 112 is output in step 170 to an application.

The application requires knowledge of object's 106 movements for operation, feedback, input, control or other functions. The application has a control mechanism that initiates and terminates operation of motion capture program via control command 172. In several advantageous applications object 106 is a hand-held object and trajectory 112 is used for data input, as will be addressed in more detail below.

Preferably, upon completion of one cycle of initial sequenced pattern a re-evaluation is performed in step 174. During re-evaluation beacons flagged during step 156 are removed from the data set or the optimized sequenced pattern to speed up operation. Beacons that fail in filtering or normalization steps 154, 158 may be adjusted or left out. Finally, any high quality beacons as determined by navigation algorithm 162 can be used for benchmarking or weighting. Of course, these decisions can be periodically re-checked to ensure that beacons yielding high quality data at a different pose are not turned off permanently. Additionally, intermittent background measurements are made with all beacons off at regular intervals or on an as-needed basis for background subtraction.

Alternatively, optimization and re-evaluation of the sequenced pattern is performed on-the-fly. In this case the initial cycle does not need to be completed and information from some beacons, e.g., the latter portion of the cycle may be disregarded altogether.

In a preferred embodiment of the method, the sequenced pattern of emission of radiation 110 by the beacons is controlled based on one or more absolute pose parameters determined by navigation algorithm 162. The control can be a temporal control as in when the beacons are on, or spatial control of which beacons should be used and/or which beacons should be relocated and affixed at new locations in the environment. To this effect, in step 176 an optimized sequenced pattern is prepared based on the re-evaluation from step 174. If the application issues request 180 for further output from motion capture program 145, then the optimized sequenced pattern is activated in step 182 and the cycle of centroid capture re-starts at step 150. Otherwise, motion capture program is terminated in step 184.

In an alternative embodiment, motion capture program 145 employs an absolute navigation algorithm 162 that only outputs a subset of absolute pose parameters $(x,y,z,\phi,\theta,\psi)$. In one example, only $(x,y,z)$ parameters defining the position of point of view 111 or some other point on object 106, e.g., point 106' are output. These parameters can be used when inclination parameters are not required by the application. An example of such application is a three-dimensional digitizer. In another example, only $(\phi,\theta,\psi)$ parameters of the pose of object 106 are output. These can be used by an application that requires only orientation or angle information for its input or control functions, e.g., when object 106 is a remote pointer, joystick, three-dimensional controller, pointer, other hand-held object or indeed any object in need of angular navigation only.

In still another alternative embodiment, motion capture program 145 employs a relative navigation algorithm 162' that only outputs changes in some or all pose parameters $(\Delta x,\Delta y,\Delta z,\Delta\phi,\Delta\theta,\Delta\psi)$. For example, navigation algorithm 162' may determine linear and/or angular velocities $$\left(\frac{dx}{dt}, \frac{dy}{dt}, \frac{dz}{dt}, \frac{d\phi}{dt}, \frac{d\theta}{dt}, \frac{d\Psi}{dt}\right),$$

accelerations or higher order rates of change, such as jerk, of any pose parameter or combination thereof. It should be noted that absolute pose may not be determined at all by relative navigation algorithm 162'. Thus, the rates of change may be the results of variations of unknown combinations of absolute pose parameters. Relative navigation algorithm 162' is advantageous for applications that do not require knowledge of trajectory 112 but just rates of change. Such applications include navigation of relative hand-held devices such as two-dimensional mice, three-dimensional mice, relative mouse-pens and other controls or relative input devices.

In certain applications, such as when the object is being moved by a user, it is advantageous to provide the user with feedback of the absolute value of at least one pose parameter determined by navigation unit 138 from centroids 131. For example, when the object is a three-dimensional digitizer, it is advantageous that a trace of the nib's motion in three-dimensional space be displayed to the user and/or in any three-dimensional digitization software. When the object is a jotting implement, the motion of the nib on a jotting surface should be captured and displayed to the user. The trace of the nib is conveniently called a digital ink trace.

Alternatively, the method of invention can also be employed to determine a relative motion of the object from at least one parameter of the object's pose. For example, rather than determining the absolute value of any specific parameter from a rigorous 3-D navigation algorithm, an optical flow computation is applied to determine changes in one or more pose parameters. Such application may be useful when the object is a hand-held device such as a mouse, a pointer, a joystick, a remote control or other device that operates in a relative mode, e.g., a scroll mode. In these applications a user feedback of the relative motion is provided, preferably in the form of a visual indicator such as a cursor or pointer moving on a screen or on a display.

Optical navigation system 100 provides high precision optical flow measurements of relative changes in pose or any of its parameters and high accuracy absolute values of any pose parameters, especially when using a statistically large number of beacons B1, B2, . . . , Bn for the computation. Such optical flow measurements are particularly useful in navigating optical mice and flying optical mice as described, e.g., by G. Gordon et al., "Silicon Optical Navigation", Agilent Technologies Technical Bulletin, 2004, pp. 1-7.

System 100 is inherently low-bandwidth, since PSD 104 reports just four values, namely $(x_i^+, x_i^-, y_i^+, y_i^-)$ corresponding to the location of centroid 131 produced by one or more known beacons. The intrinsically high signal-to-noise ratio (SNR) of centroid 131 due to low background noise allows system 100 to operate at high capture rates, e.g., up to 10 kHz and higher, rendering it ideal for tracking fast moving objects. In fact, system 100 is sufficiently robust to navigate even rapidly moving hand-held objects, including pointers, controllers, mice, high-precision gamer instruments, jotting implements and the like in close-range environments or constrained areas such as desks, hand-held notepads, point-of-sale environments and various game-and work-spaces.

Optical navigation system 100 admits of many embodiments.

First and foremost, centroid sensing device 104 can use various physical principles to obtain the centroid of imaged distribution 130 of electromagnetic radiation 110 (and ambient radiation 120). A person skilled in the art will recognize that even a regular full field sensor, e.g., a digital CMOS camera, can act as centroid sensing device 104. In general, however, the use of a standard full-frame capture CMOS sensor with a large number of individual pixels will not be very efficient. That is due to the large computational burden associated with processing large numbers of image pixels and lack of intrinsic facility in centroid sensing. In addition, fast motion capture and high frame rates required for navigating hand-held objects with on-board equipment are not compatible with the high-power and large bandwidth requirements of digital CMOS sensors.

Another semiconductor-type PSD 200 that can be employed in system 100 as centroid sensing device 104 is illustrated in the isometric view of FIG. 7A. Device 200 is sometimes referred to as a duo-lateral PSD and has a reverse biased p-n junction between p-type and n-type semiconducting materials 202, 204. Imaged electromagnetic radiation 110 impinges at spot 130 and creates positive and negative carriers σ+, σ−. X-signals $(x_i^+, x_i^-)$ corresponding to centroid 131 are obtained from electrodes 206, 208 that collect positive charge carriers σ+. Y-signals $(y_i^+, y_i^-)$ of centroid 131 come from electrodes 210, 212 that collect negative charge carriers σ−. Note that in this embodiment all charge carriers are used to generate useful signals and hence one obtains a good signal-to-noise ratio (SNR).

Another suitable controid sensing device 220 is shown in the cross-sectional side view of FIG. 7B. Device 220 has a top layer 222 for admitting imaged electromagnetic radiation 110. An optical filtering layer 224 contains densely spaced vertically oriented optical fibers 226. Fibers 226 in the vicinity of spot 130 collect and guide radiation 110 from top layer 222 to a sensing layer 228. Layer 228 can employ any type of physical sensing mechanism, including pixels or a photosensitive surface. The advantage of device 220 is that optical fibers 226 can be extended, as indicated by dashed line 230 and thus the signal can be flexibly delivered to a remote location. This offers great flexibility in on-board design of object 106 and in the general design of optical navigation systems according to the invention.

Figure 7C:
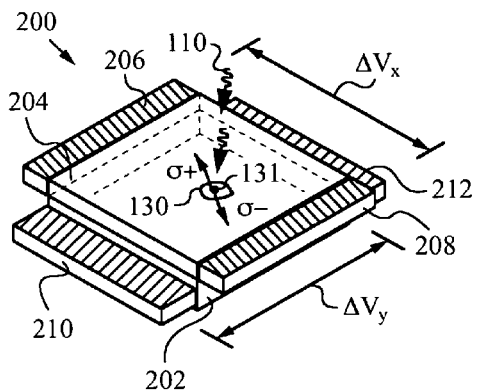
FIG. 7C is an isometric view of still another PSD for optical navigation in accordance with the invention.
Figure 7C:
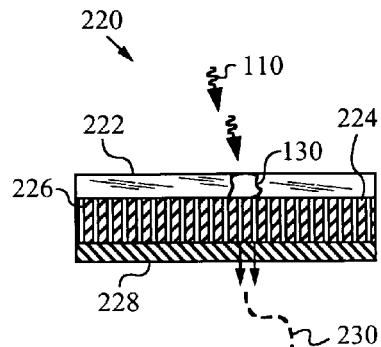
Figure 7C:
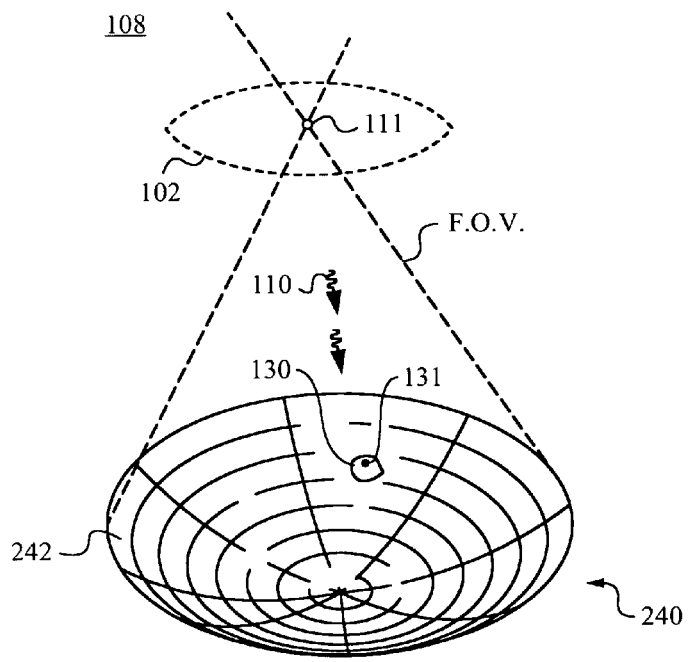

Still another suitable centroid sensing device 240 is shown in FIG. 7C. Centroid sensing device 240 is an organic position sensitive detector (OPSD) and it has a non-planar geometry. Specifically, sensing surface 242 of device 240 is non-planar; more precisely, it is concave. Concave sensing surface 242 matches or conforms to the field of view F.O.V. of optic 102 from point of view 111 such that the entire F.O.V. is imaged onto it. Preferably, the curvature of sensing surface 242 is matched to the imaging characteristics of optic 102 such that optic 102 does not require optical field flattening. In addition, the curvature of surface 242 can be designed to minimize the aberrations typically introduced by optic 102 when imaging a curved field onto a planar surface.

Figure 8:
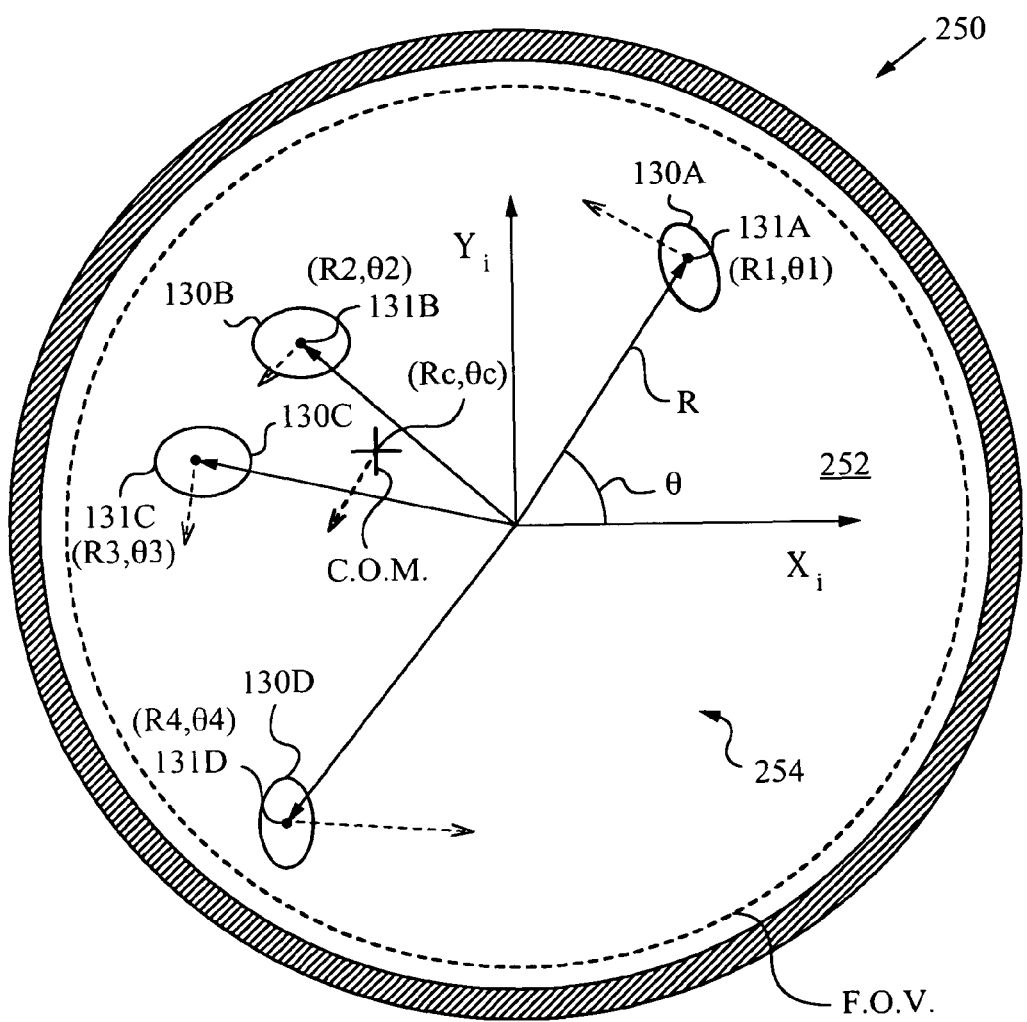
FIG. 8 is a top plan view of a position sensing device with circular symmetry for use in optical navigation in accordance with the invention.

Optical navigation unit 100 can also employ centroid sensing devices with circular and planar geometry conformant to the naturally circular F.O.V. of optic 102. Specifically, FIG. 8 shows a circular position sensitive detector 250 of the semiconductor type in which the field of view F.O.V. is conformant with the sensing surface 252 of PSD 250. In this embodiment four of beacons B1, B2, . . . , Bn are active at the same time and produce an imaged intensity distribution 254 that is a constellation of four spots 130A, 130B, 130C and 130D at four locations in the image plane of PSD 250. A center of mass (C.O.M.) of constellation 254 at the time of detection is designated with a cross and depends on the relative positions and intensities of spots 130A-D.

The circular geometry of PSD 250 enables operation in polar coordinates (R,θ). In this convention each of four spots 130A, 130B, 130C and 130D has a centroid 131A, 131B, 131C and 131D described by polar coordinates (R1,θ1), (R2, θ2), (R3,θ3) and (R4,θ4). However, due to its principles of operation PSD 250 reports to navigation unit 138 only polar coordinates (Rc,θc), of the C.O.M.

A set of dashed arrows show the movement of centroids 131A, 131B, 131C and 131D and C.O.M. as a function of time. Note that applying optical flow without determining the absolute pose of object 106 indicates an overall rotation and can be used as input for any relative motion device, e.g., an optical mouse.

Figure 9:
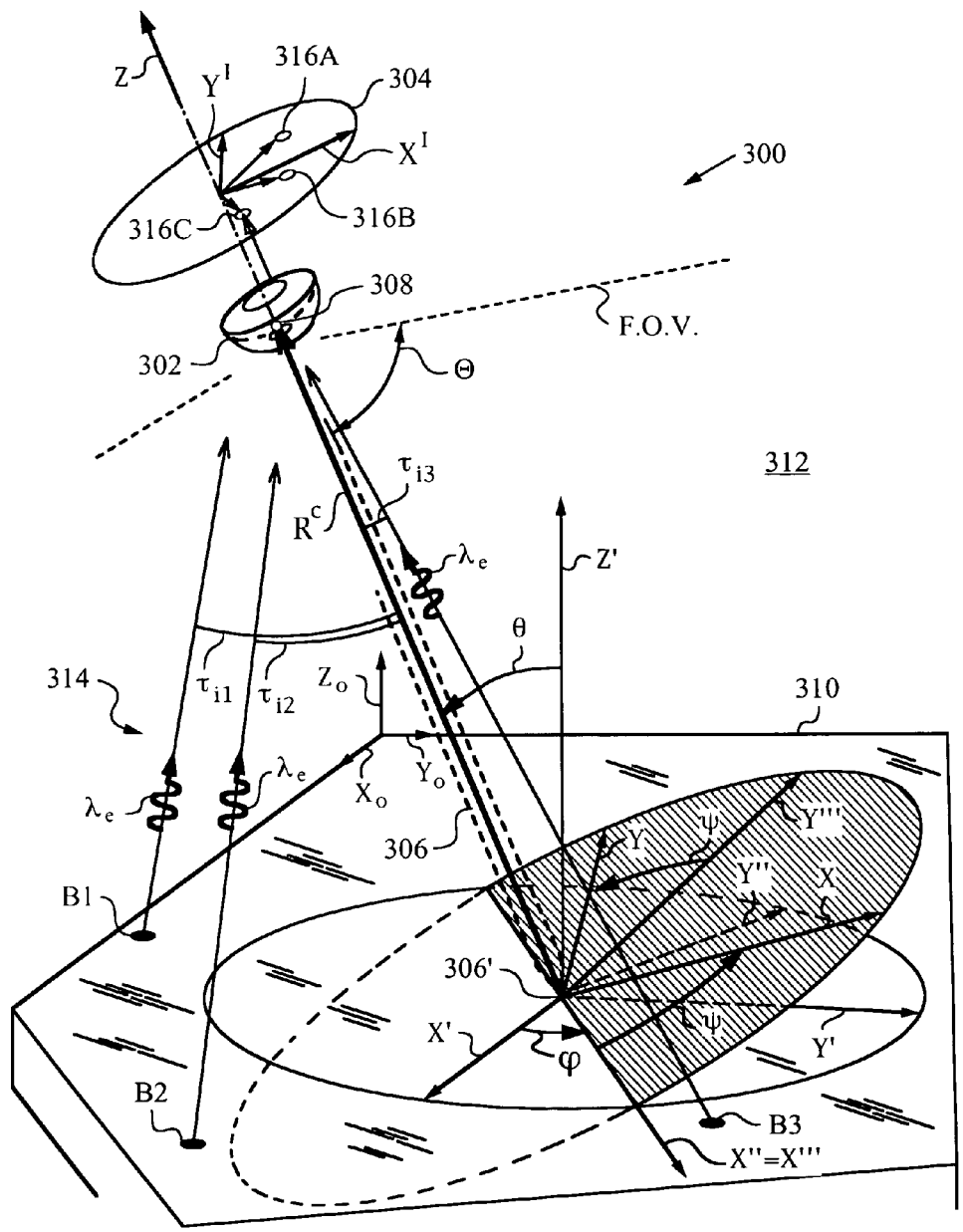
FIG. 9 is a simplified schematic view of a navigation system employed in a surface constrained application such as jotting.

FIG. 9 shows in a simplified schematic view another navigation system 300 according to the invention. System 300 employs an optic 302 on-board an elongate object 306 shown partially in dashed lines to image a large F.O.V. defined by solid angle Θ onto an on-board centroid sensing device in the form of a semiconductor-type circular PSD 304. The active surface of PSD 304 is conformant to the F.O.V. of optic 302. Optic 302 has a single point of view 308 and is preferably a catadioptric. An exemplary catadioptric lens that can be employed for this purpose is described in U.S. Pat. No. 7,038, 846 to Mandella.

Elongate object 306 has a tip 306' for moving on a jotting surface 310 in environment 312. In the present example, object 306 is a jotting implement such as a marker, a highlighter, a pencil, a brush or indeed any other writing, sketching, drawing or painting implement for jotting on jotting surface 310. Alternatively, jotting implement 306 can also be stylus or any device that jots information on jotting surface 310 by tracing that information without leaving any permanent markings (i.e., ink, charcoal, paint, relief and/or other permanent or ephemeral marking) or deformations of or on jotting surface 310. Jotting implement 306 has an elongate and rigid body of generally round cross-section designed to be held in a user's hand and terminated in a nib 306'.

Jotting surface 310 can include a desktop, a tablet, a clipboard, a pressure-sensitive digitizing tablet or any sufficiently planar and rigid surface for human jotting activity. Jotting surface 310 can also be a sheet of paper of any standard or non-standard dimensions laying flat on a support surface. In cases where jotting surface 310 is a digitizing tablet such as a graphic tablet, a PDA screen, a tablet PC screen, an ultramobile PC screen, a regular screen belonging to any communication device or any other sturdy surface then a support surface is not required.

Jotting surface 310 has a number of beacons of which three, namely B1, B2, B3 are shown affixed at known locations thereon and defining global coordinates $(X_o, Y_o, Z_o)$. Beacons B1, B2, B3 are laser diodes designed to emit electromagnetic radiation 314 at same emission wavelength $\lambda_e$, preferably in the infrared range. Beacons B1, B2, B3 are controlled by a suitable adjustment mechanism (not shown) to emit radiation 314 in a sequenced pattern.

At least three beacons B1, B2, B3 need to be in the F.O.V. of optic 302 to recover the absolute values of all five parameters $(x,y,\phi,\theta,\psi)$ of the pose of jotting implement 306 confined to move with its nib 306' in contact with jotting surface 310. This is because variation in the z parameter is eliminated by the surface constraint. FIG. 9 shows the transformation of jotting implement coordinates (X,Y,Z) with nib 306' taken as the reference point for the Euler rotations. The coordinate transformation from single point of view 308 of optic 302 is performed by knowing the value of vector $R^c$ between nib 306' and single point of view 308. Note that (x,y) positions of nib 306' at successive points in time correspond to trace (digital ink) and Euler angles $(\phi,\theta,\psi)$ correspond to orientation. A person skilled in the art will appreciate that for reliable recovery of the absolute value of any of the five pose parameters $(x,y,\phi,\theta,\psi)$ it is preferable to provide more than the three beacons shown. Fewer beacons (but at least one) are required if only relative navigation is practiced. For more general information on absolute navigation and absolute pose recovery with a surface constraint the reader is referred to U.S. Pat. No. 7,203,384 to Carl and to K. Kanatani, op. cit.

Figure 10:
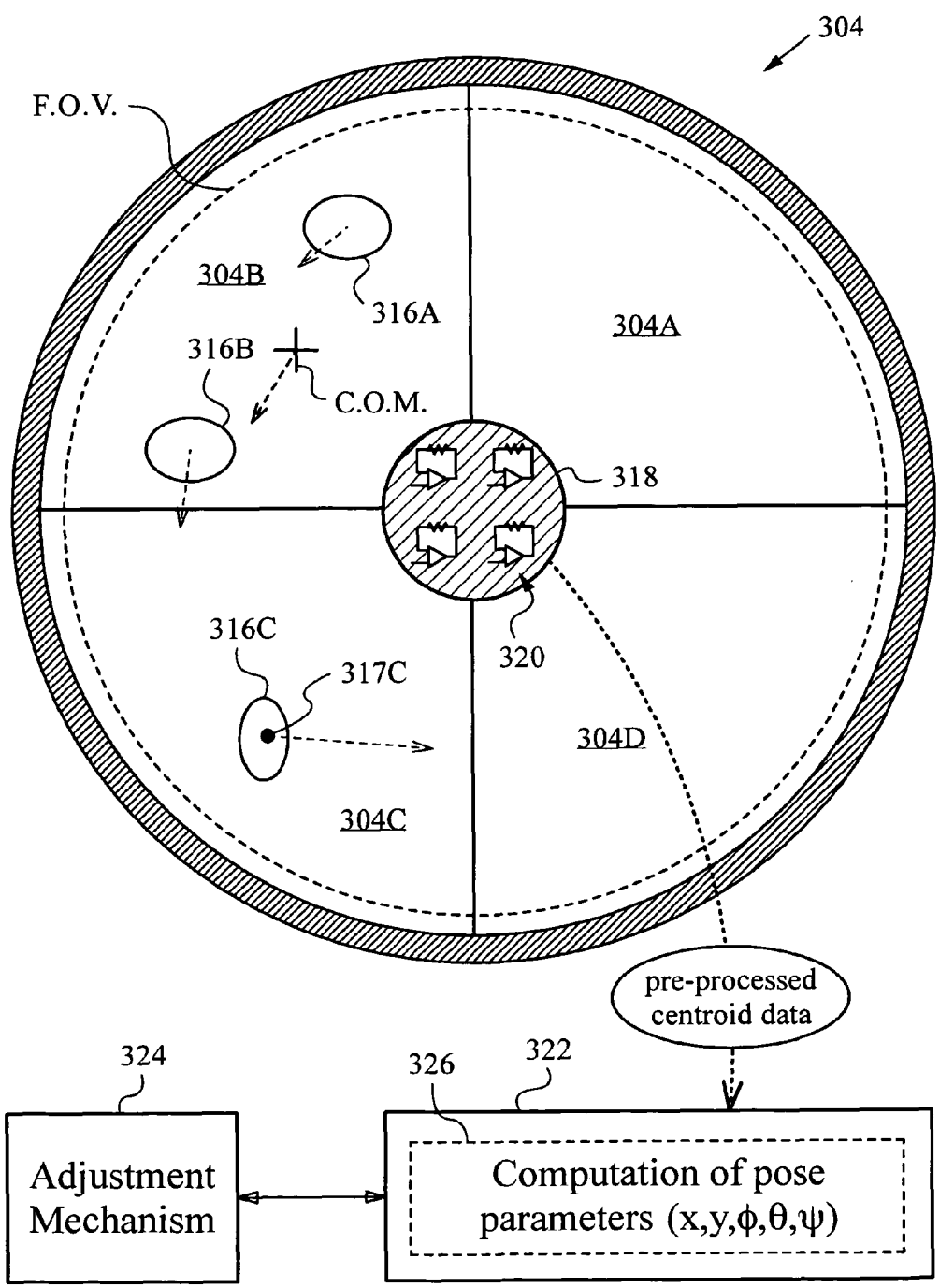
FIG. 10 is a diagram with a top plan view of the position sensing device (PSD) used by the navigation system of FIG. 9.

Radiation 314 emitted by beacons B1, B2, B3 and arriving at optic 308 at corresponding field angles $\tau_{i1}, \tau_{i2}, \tau_{i3}$ defined with respect to a center axis of jotting implement 306 is imaged by optic 302 onto PSD 304 in a distribution that corresponds to spots 316A, 316B, 316C. As illustrated in more detail in FIG. 10, spots 316A, 316B, 316C form a constellation. The body of jotting implement 306 presents a central obstruction in the F.O.V. and produces a corresponding central shadow region 318 in the image plane of PSD 304.

PSD 304 is segmented into four segments 304A, 304B, 304C and 304D. In fact, PSD 304 is a segmented semiconductor-type position sensitive detector that reports separate centroids for each segment. Given the distribution of spots in the image plane on PSD 304, two spots 316A, 316B are imaged onto segment 304B and one spot 316C is imaged onto segment 304C. Therefore, segment 304B reports its centroid as being the center-of-mass (C.O.M.) of spots 316A, 316B while segment 304C reports its centroid as centroid 317C of spot 316C. No centroids are reported by segments 304A and 304D. The dashed arrows indicate the movement of spots 316A, 316B, 316C and C.O.M. as a function of time and these can be used for an optical flow based navigation algorithm in case only relative navigation is required (e.g., if the jotting implement only functions as a mouse).

Since, no centroid information can be obtained from region 318, usable electronics 320 belonging to a navigation unit 322 and/or an adjustment mechanism 324 that regulates sequenced pattern of laser diodes B1, B2, B3 is/are located on-board jotting implement 306 in region 318. Electronics 320 are indicated in a general manner only and typically include amplifiers, filters and other circuitry for gain control, signal processing, filtering and normalization functions (i.e., pre-processing) of PSD centroid data encoding C.O.M. from segment 304B and centroid 317C from segment 304C prior to passing the data on to navigation unit 322. Actual circuit designs will be well-known to those skilled in the art.

During operation of system 300, a motion capture program 326 executed by navigation unit 322 preferably implements an absolute navigation algorithm to determine all five pose parameters $(x,y,\phi,\theta,\psi)$. As mentioned above, the absolute navigation algorithm can employ the principles of perspective geometry and vanishing points to perform this task. Preferably, the pose parameters are captured or updated at a rate of 100 Hz or higher. In other words, absolute values of pose parameters $(x,y,\phi,\theta,\psi)$ in global coordinates $(X_o, Y_o, Z_o)$ are determined 100 times per second.

Absolute pose parameters $(x,y,\phi,\theta,\psi)$ can be employed in various applications, such as capture of digital ink expressed by parameters (x,y), angular motion capture expressed by parameters $(\phi,\theta,\psi)$ or capture of the entire motion sequence of jotting implement 306. A number of applications for absolute pose parameters $(x,y,\phi,\theta,\psi)$ of an elongate object including a jotting implement are discussed in U.S. Published Application No. 2005/0168437 to Carl et al.

Alternative motion capture program 326 employs a relative navigation algorithm that only determines changes in one or more pose parameters $(\Delta x, \Delta y, \Delta \phi, \Delta \theta, \Delta \psi)$. These changes can include linear and/or angular velocities $$\left(\frac{dx}{dt}, \frac{dy}{dt}, \frac{d\phi}{dt}, \frac{d\theta}{dt}, \frac{d\Psi}{dt}\right),$$

accelerations or higher order rates of change, such as jerk, of any pose parameter or combination thereof. It should be noted that absolute pose may not be determined at all by the relative navigation algorithm and the rates of change result from variations of unknown combinations of absolute pose parameters since the absolute pose is not ever determined for reference. However, relative navigation data of this type can be used in a wide variety of applications, including relative motion pens (mouse-pens) and motion controls.

Figure 11:
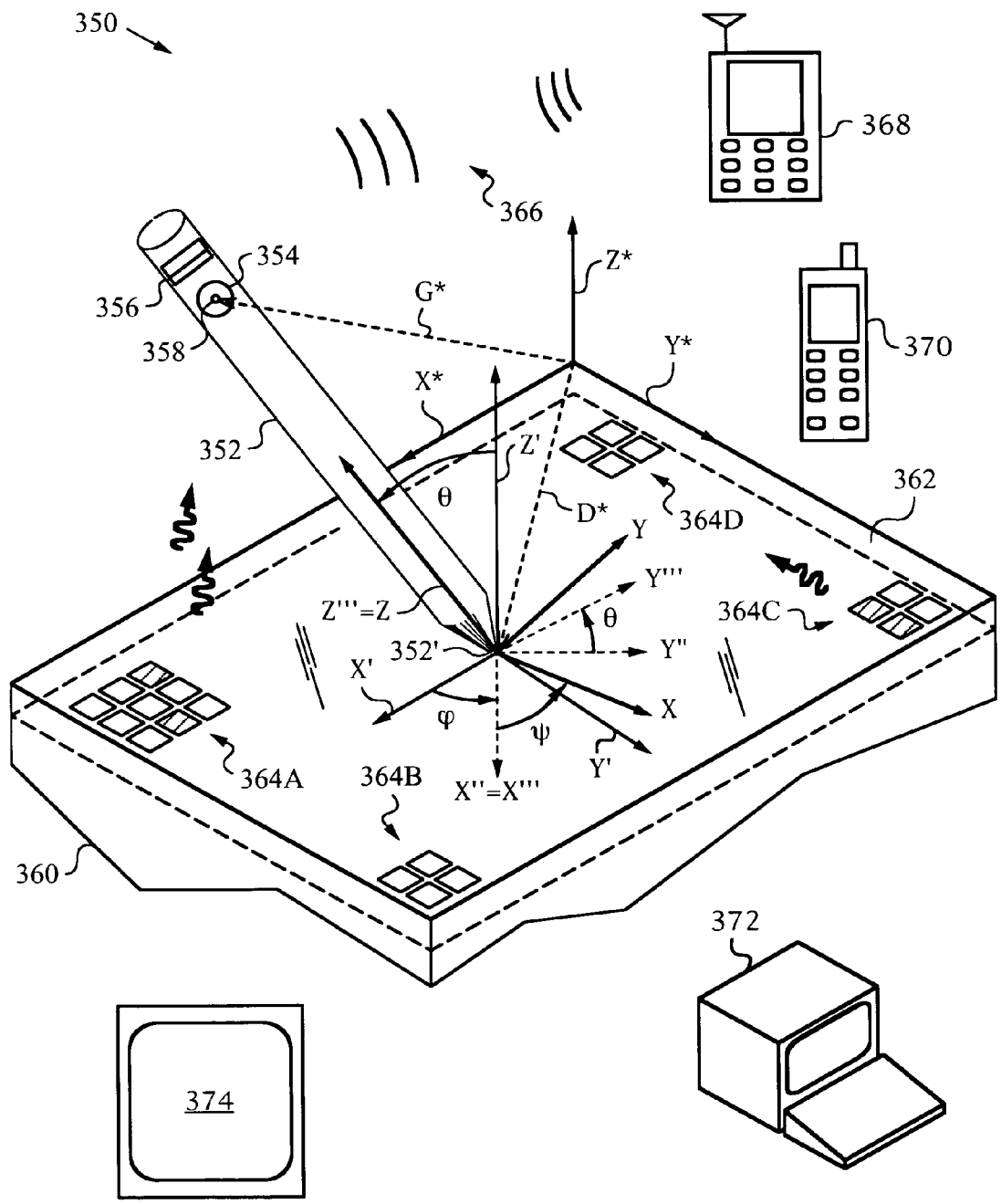
FIG. 11 is a three-dimensional diagram of a navigation system for a hand-held object used with a host computer and standard communications devices.

FIG. 11 illustrates still another optical navigation system 350 in which a hand-held elongate object 352 with a nib 352' is navigated with the aid of an on-board optic 354, and an on-board centroid sensing device 356. Optic 354 has a single point of view 358 and images incident radiation from a wide F.O.V., preferably at least 150°.

Object 352 cooperates with a host structure 360 that has a jotting surface 362 and a number of beacons 364 affixed thereto. Beacons 364 are broken up into four groups 364A, 364B, 364C and 364D and are all indexed to jotting surface 362 to establish host coordinates (X*,Y*,Z*) that serve the function of global coordinates for motion capture of hand-held object 352.

Surface 362 is flat and rigid to support jotting activity. In some embodiments, surface 362 is integrated with a display screen or other mechanisms for visually displaying information to a user. In other embodiments host structure 360 is a graphic tablet or a sign-in tablet and jotting surface 362 is non-transparent. In the present embodiment, host structure 360 is a computing device and more specifically a tablet computer and jotting surface 362 is integrated with its display. Beacons 364 can be designated pixels belonging to tablet computer's 360 display or separate sources, e.g., infrared diodes in the bezel of computer 360. In the latter case, beacons 364 are indexed to the display such that host coordinates (X*,Y*,Z*) map to display coordinates.

Both absolute navigation and relative navigation algorithms are applied to capture motion of hand-held object 352. The functions of navigation unit and mechanism for adjusting the sequenced pattern of beacons 364 are delegated to the processing resources of tablet computer 360, e.g., the central processing unit (CPU) and/or the graphics processing unit (GPU). A communication link (not shown) established via any standard wired or wireless interface with host computer 360 is employed to share the centroid data obtained by centroid sensing device 356 with tablet computer 360.

Absolute algorithms capture parameters of pose describing the trace of nib 352', namely (x,y). The trace or digital ink is captured directly in display coordinates described by the time-varying vector D*(t). Relative motion of view point 358 is tracked by the relative motion algorithm and its precise location in host coordinates (X*,Y*,Z*), designated by vector G*, does not need to be determined.

The relative motion is provided along with trace D*(t) for increased relative resolution. Note that various digital ink processing functions, including handwriting recognition require combining high relative resolution on the order of 800 dpi at high capture rate with absolute digital ink D*(t) of millimeter level accuracy at a lower capture rate.

In one convenient embodiment, the absolute navigation algorithms also capture the pose parameter (z) of nib 352' also referred to as height of hover above display 362 by skilled artisans. This parameter is provided to tablet computer 360 for hover applications such as remote pointing, gesturing, dragging and other mouse functions. A three-dimensional trace of nib 352' can be captured as well for applications such as three-dimensional digitization. In addition, the pose parameters whether in absolute or relative format and whether hand-held object 352 is in contact with surface 362 or in hover mode can be employed for gesturing.

Since navigation system 350 also recovers pose parameters (x,y,z) when nib 352' is off to the side of display surface 362, digital ink as well as hover are supported when hand-held object is operating on other surfaces, as long as a sufficient number of beacons 364 necessary for the absolute and/or relative navigation algorithms remain in the field of view of optic 354. Thus, a user can employ hand-held object 352 to jot on surfaces located in the vicinity of tablet computer 360, e.g., to write on a piece of paper located next to tablet computer 360 if nib 352' is of the type capable of leaving a marking such as an ink trace.

In addition to tablet computer 360, other computing and communications devices can benefit from knowing one or more pose parameters of hand-held object 352. Thus, object 352 can use a communication link 366 to communicate centroid data to devices such as portable digital assistant (PDA) 368, cellular phone 370, home computer 372 and ultra-mobile computer 374. Alternatively, devices 368, 370, 372, 374 can obtain processed pose parameters from tablet computer 360 via a separate communications channel or network such as the Internet. It should be noted that hand-held object 352 can cooperate directly with any of devices 368, 370, 372, 374 provided that they either are also equipped with beacons and serve the function of a host structure or are near tablet computer 360 such that beacons 364 remain in the field of view of optic 354.

Figure 12:
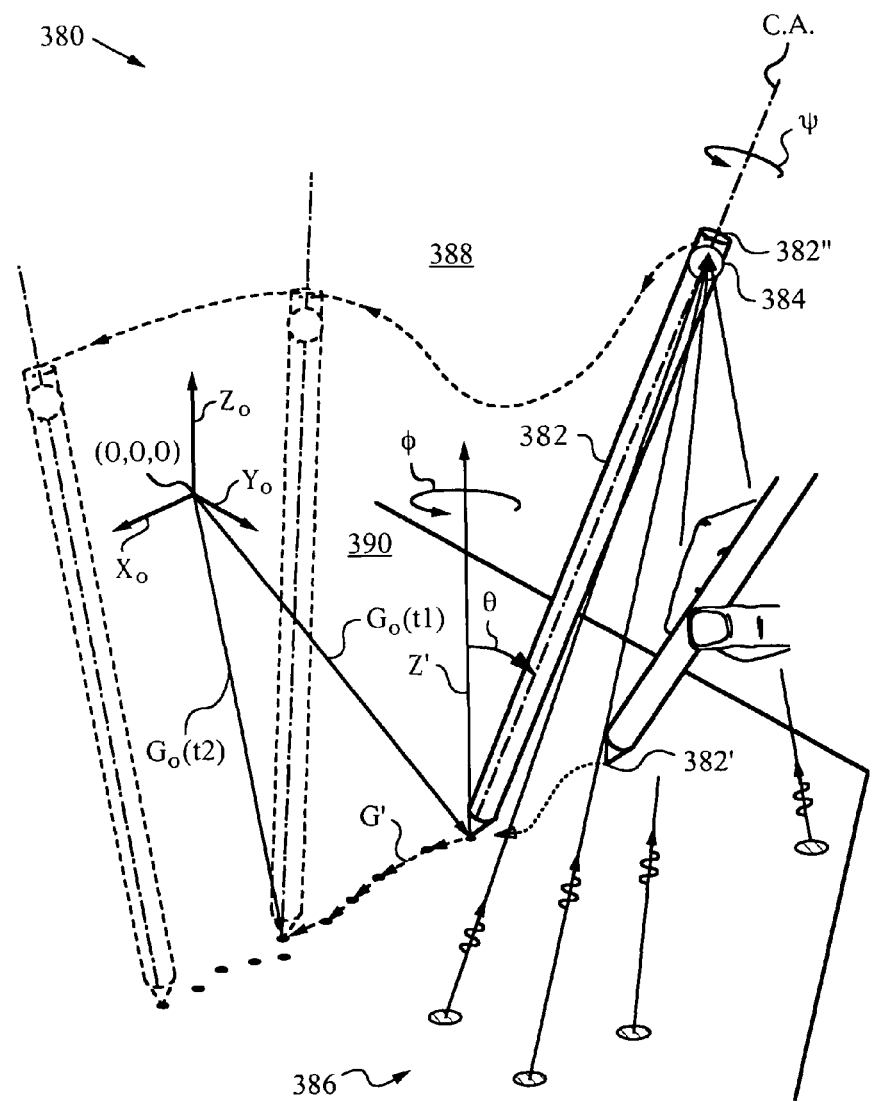
FIG. 12 is an three-dimensional diagram of a navigation system for hand-held objects with relative motion interpolation and biometric capabilities.

FIG. 12 illustrates a navigation system 380 for an elongate hand-held object 382 with an integrated navigation unit 384. Unit 384 is shown schematically and its components are not shown for reasons of clarity. It is understood that unit 384 has an optic, a centroid sensing device, a navigation unit and an adjustment mechanism for coordinating a sequenced pattern of beacons 386. Object 382 is shaped like a pen or stylus and the points of reference used for navigation purposes are its tip 382' and its distal end 382".

Navigation system 380 employs absolute and relative navigation algorithms in its navigation unit. Absolute navigation algorithm determines all parameters of pose $(x,y,z,\phi,\theta,\psi)$ of object 382 in an environment 388 defined by global coordinates $(X_o,Y_o,Z_o)$ defined with respect to beacons 386 affixed on a surface 390. Relative navigation algorithm determines first order rates of change $$\left(\frac{dx}{dt}, \frac{dy}{dt}, \frac{dz}{dt}, \frac{d\phi}{dt}, \frac{d\theta}{dt}, \frac{d\Psi}{dt}\right)$$

of all parameters of the pose. The three Euler angles are indicated for clarity, with the last rotation $\psi$ being defined around a center axis (C.A.) of object 382.

System 380 operates by providing absolute pose at a certain low frequency, e.g., 1-100 Hz, and relative pose at a higher frequency, e.g., 100-1,000 Hz. Absolute pose is described by vector $G_o$ and the Euler angles and is determined at times t1, t2 and so on. Meanwhile, relative pose is described by vector adjustments G' and changes in the Euler angles and is provided between times t1, t2 and so on. This manner of operation is useful for interpolation between absolute poses and to reduce the amount of computation since it is generally less resource-intensive to determine changes in pose parameters rather than their absolute values in global coordinates. This approach is also useful for eliminating typical drift experienced by prior art relative motion devices operating in quasi-absolute mode such as optical mouse pens.

The motion of distal end 382" is captured for the purposes of reporting a "hidden signature" associated with the trace of nib 382'. "Hidden signature" can be employed for numerous functions such as user verification in electronic financial transactions, ID verification, remote log-in, electronic sign in logs, homeland security related authentication as well as biometric applications.

Figure 13:
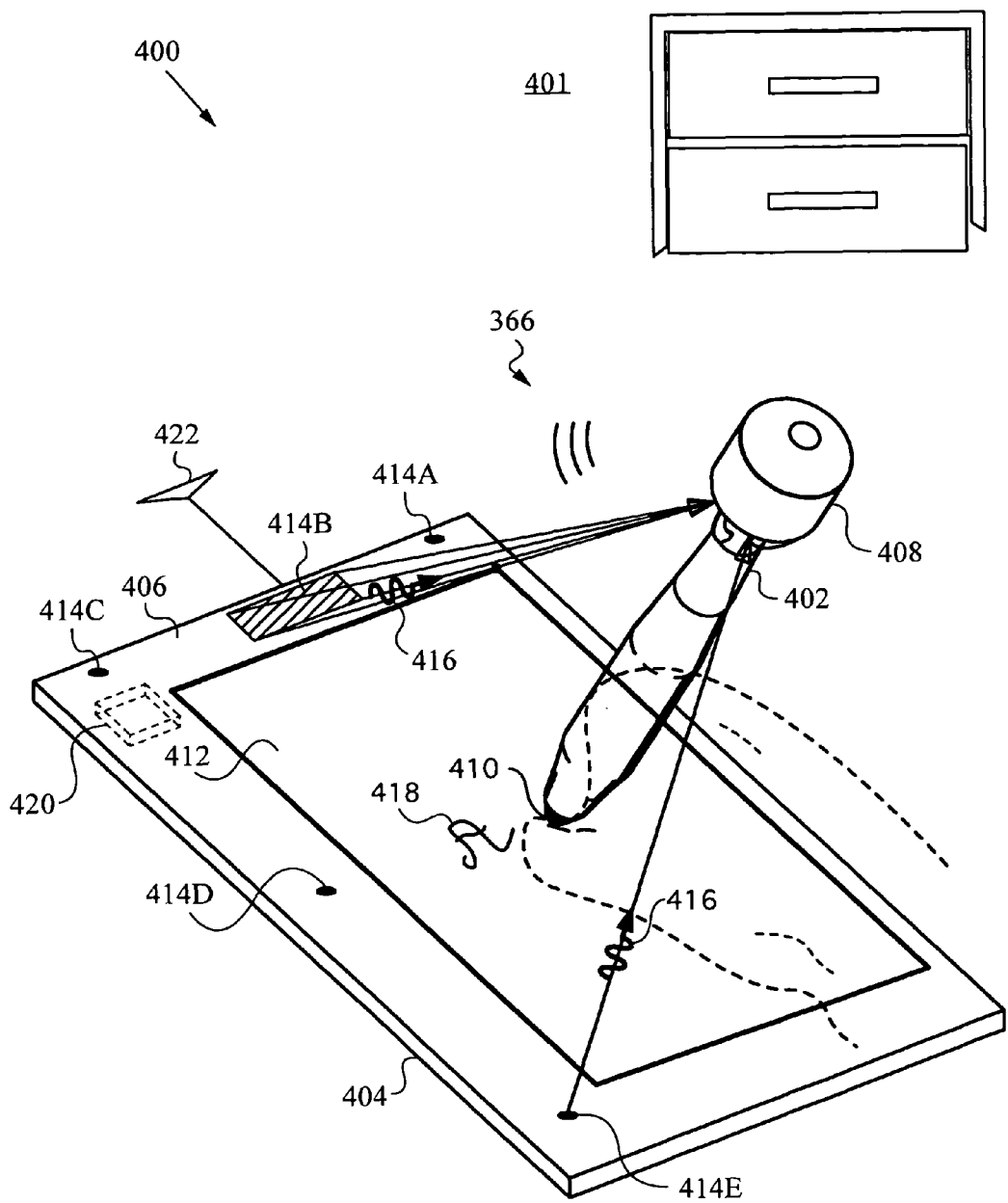
FIG. 13 is a three-dimensional diagram of a navigation system for a clipboard host structure.

FIG. 13 illustrates still another navigation system 400 designed for determining pose parameters $(x,y,\phi,\theta,\psi)$ of a hand-held jotting implement 402 operating in an office environment 401. System 400 has a portable host structure 404 with a rigid jotting surface 406 for writing, drawing or sketching. Jotting implement 402 is a pen with a snap-on optical navigator 408 housing an optic, a centroid sensing device and a navigation unit (not shown). The point of reference used for navigation purposes is an ink-dispensing ball-point 410.

Preferably, host structure 404 is a clipboard for holding down paper 412 on surface 406. Beacons 414A, 414B, 414C, 414D and 414F for emitting electromagnetic radiation 416 are permanently affixed to clipboard 404 and indexed to the position of paper 412. The clipboard has a suitable adjustment mechanism for cooperating with navigation unit 408 and enforcing the requested sequence pattern of beacons 414A, 414B, 414C, 414D and 414E.

Beacons 414A, 414C, 414D and 414E are point sources while beacon 414B is an extended source of radiation 416. Therefore, the centroid produced by imaged distribution of radiation 416 from beacon 414B will change as a function of perspective projection of the shape of beacon 414B imaged by the optic. The additional information contained in this change can be used by the absolute and/or relative navigation algorithm for recovering any of the pose parameters of pen 402.

During operation, optical navigator 408 reconstructs ink trace 418 left by pen 402 on paper 412. Clipboard 404 has a data capture device 420 for receiving reconstructed ink trace 418 from navigator 408 via a wireless link 422. Alternatively, link 422 between navigator 408 and capture device 420 is wired, enabling the user to tether pen 402 to clipboard 404 to prevent loss. Data capture device 420 may additionally match up ink trace 418 to any indices, check-boxes, fill-in ovals or other pre-printed features on paper 412. The user can employ pen 402 for filling out forms in business, legal, medical, engineering, accounting, administration, inventory management, construction and other industries reliant on the filling out of paper forms.

Figure 14:
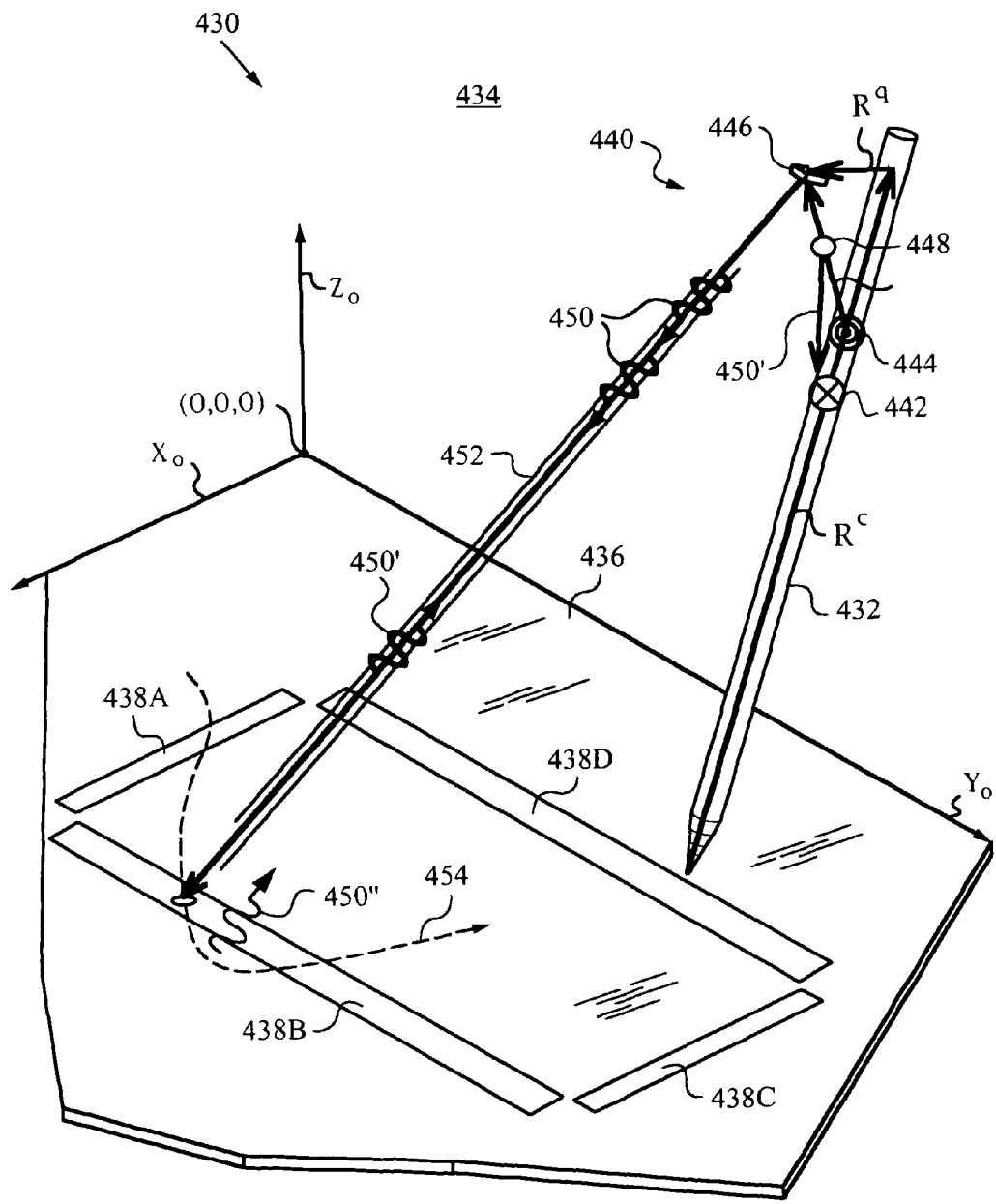
FIG. 14 is a three-dimensional diagram of a navigation system employing on-board illumination and retroreflecting beacons.

FIG. 14 shows yet another navigation system 430 for navigating a hand-held object 432 in an environment 434.

Environment 434 offers a rigid surface 436 for human jotting activities and also supports free-space gesturing with respect to surface 436. In contrast to previous embodiments, system 430 employs beacons 438 that do not emit electromagnetic radiation, but rather reflect it. In fact, beacons 438 are retroreflectors affixed to surface 436.

An optical navigator 440 atop object 432 has an on-board centroid sensing device 442 as well as an illumination source 444. On-board optics include a steering mirror 446 for directing an electromagnetic radiation 450 emitted in a beam 452 from source 444 into environment 434. Same mirror 446 and a beam splitter 448 recover radiation 450' retroreflected from beacons 438 and project it on centroid sensing device 442. The orientation of mirror 446 defines an instantaneous view point of navigator 440.

Beacons 438 include strips 438A, 438B, 438C, 438D that outline a rectangular contour. Of course, beacons 438 can have arbitrary shapes and don't need to outline any regular geometric shape. However, reconstructing an environment based on perspective projection of a rectangular object composed of strips 438A, 438B, 438C, 438D affixed to rigid surface 436 is particularly convenient for navigation purposes.

Mirror 446 is appropriately driven to ensure that beam 452 executes a scan path 454 in environment 434. Scan path 454 needs to have a sufficient spatial extent to ensure that beam 452 intercepts beacons 438 to generate retroreflected radiation 450'. Methods for driving scanning mirrors and executing appropriate scan paths are well-known in the art.

For examples that can be used in the present embodiment the reader is referred to U.S. Pat. No. 7,088,440 to Buermann et al.

During operation, navigator 440 receives centroid data from centroid sensing device 442 at times when scan path 454 crosses any of beacons 438. Of course, some radiation 450" is reflected at all times from surface 436 and any objects in environment 434, but the centroid produced by reflected radiation 450" is of low intensity compared to retroreflected radiation 450'. The low intensity centroid data due to reflected radiation 450" is filtered out, e.g., by a threshold filter. Navigator 440 employs relative and absolute navigation algorithms based on centroids produced by retroreflected radiation 450' originating from beacons 438 to recover one or more parameters of the pose of hand-held object 432.

The various embodiments disclosed above provide a high-precision, low-bandwidth and high capture rate optical navigation system for tracking objects in close-range environments and are particularly well-suited for navigating hand-held objects. The navigation systems and methods are sufficiently robust to navigate even rapidly moving hand-held objects, including pointers, controllers, mice, jotting implements and other small objects in constrained environments or work-spaces. The advantages of the present navigation system stem from the realization that an on-board optic and centroid sensing device cooperate better with inexpensive beacons affixed in the environment than a number of more expensive cameras or position sensing modules located in the environment to track objects that have beacons affixed to them.

It is understood that the present system can be employed in association with any prior art motion capture system, including relative navigation systems such as inertial navigators with gyroscopes and accelerometers. In fact, any relative system can take advantage of the absolute navigation capability of the present optical system for obtaining ground truth. The present system can also be combined with absolute motion capture systems including ultrasonic and radio-frequency (RF) systems to corroborate ground truth or act in a support or back-up capacity.

It will be evident to a person skilled in the art that the present invention admits of various other embodiments. Therefore, the scope of the invention should be judged by the appended claims and their legal equivalents.

The invention claimed is:

1. An optical navigation system for determining a pose of an object in an environment, said optical navigation system comprising:

a) a plurality of beacons at predetermined locations in said environment for providing an electromagnetic radiation in a sequenced pattern;
b) an on-board optic for imaging said electromagnetic radiation onto an on-board centroid sensing device for determining a centroid of an imaged distribution of said electromagnetic radiation;
c) a navigation unit for determining said pose from said centroid.

2. The optical navigation system of claim 1, wherein said sequenced pattern is a modulated sequenced pattern.

3. The optical navigation system of claim 2, wherein said navigation unit comprises a mechanism for adjusting said sequenced pattern based on said pose.

4. The optical navigation system of claim 2, wherein said sequenced pattern comprises amplitude modulation of said plurality of beacons.

5. The optical navigation system of claim 2, wherein said sequenced pattern comprises frequency modulation of said plurality of beacons.

6. The optical navigation system of claim 2, wherein said sequenced pattern comprises one beacon of said plurality of beacons providing said electromagnetic radiation at one time.

7. The optical navigation system of claim 2, wherein said sequenced pattern comprises more than one of said plurality of beacons providing said electromagnetic radiation at one time.

8. The optical navigation system of claim 1, wherein said predetermined locations are adjusted by a mechanism based on said pose.

9. The optical navigation system of claim 1, wherein said on-board centroid sensing device comprises a position sensitive detector selected from the group consisting of semiconductor-type position sensitive detectors, optical waveguide-based position sensitive detectors and organic material position sensitive detectors.

10. The optical navigation system of claim 9, wherein said position sensitive detector is a segmented semiconductor-type position sensitive detector.

11. The optical navigation system of claim 9, wherein said position sensitive detector conforms to a field of view of said optic.

12. The optical navigation system of claim 9, wherein said position sensitive detector is non-planar.

13. The optical navigation system of claim 1, wherein at least one beacon of said plurality of beacons is affixed to a host structure.

14. The optical navigation system of claim 13, wherein said host structure comprises a computing device.

15. The optical navigation system of claim 13, wherein said host structure comprises a communications device.

16. The optical navigation system of claim 13, wherein said host structure comprises a jotting surface.

17. The optical navigation system of claim 1, wherein said plurality of beacons comprise light emitting elements that emit said electromagnetic radiation at an infrared wavelength.

18. The optical navigation system of claim 1, wherein said object comprises a hand-held device.

19. The optical navigation system of claim 18, wherein said hand-held device comprises a jotting implement for cooperating with a jotting surface in said environment.

20. The optical navigation system of claim 19, wherein said plurality of beacons are indexed to said jotting surface.

21. The optical navigation system of claim 18, wherein said hand-held device comprises a hand-held implement for cooperating with a display in said environment.

22. The optical navigation system of claim 21, wherein at least one of said plurality of beacons is indexed to said display.

23. A method for optically determining a pose of an object in an environment, said method comprising:
a) affixing a plurality of beacons at predetermined locations in said environment for providing an electromagnetic radiation in a sequenced pattern;
b) providing said object with an on-board optic for imaging said electromagnetic radiation onto an on-board centroid sensing device for determining a centroid of an imaged distribution of said electromagnetic radiation;
c) determining said pose from said centroid.

24. The method of claim 23, further comprising the step of controlling said sequenced pattern based on said pose.

25. The method of claim 23, wherein said pose comprises an absolute value of at least one pose parameter referenced in said environment.

26. The method of claim 25, wherein said method further comprises determining an absolute position of a point of said object in said environment.

27. The method of claim 25, further comprising producing a user feedback of said absolute value.

28. The method of claim 27, wherein said user feedback comprises a trace.

29. The method of claim 23, further comprising determining a relative motion from said pose.

30. The method of claim 29, wherein said relative motion determination comprises an optical flow computation.

31. The method of claim 29, further comprising producing a user feedback of said relative motion.

32. The method of claim 31, wherein said user feedback comprises a visual indicator.

* * * * *